INVENTOR.
WINFIELD JOHNSTON
BY
ATTORNEY

Sept. 22, 1964 W. JOHNSTON 3,149,593
NEEDLE POSITIONING MECHANISM
Filed Feb. 21, 1961 10 Sheets-Sheet 3

INVENTOR.
WINFIELD JOHNSTON
BY *Leon Edelson*
ATTORNEY

Sept. 22, 1964  W. JOHNSTON  3,149,593
NEEDLE POSITIONING MECHANISM
Filed Feb. 21, 1961  10 Sheets-Sheet 4

INVENTOR.
WINFIELD JOHNSTON
BY *Leo Edelsen*
ATTORNEY

Sept. 22, 1964 W. JOHNSTON 3,149,593
NEEDLE POSITIONING MECHANISM
Filed Feb. 21, 1961 10 Sheets-Sheet 5

INVENTOR.
WINFIELD JOHNSTON
BY
ATTORNEY

Sept. 22, 1964

W. JOHNSTON 3,149,593

NEEDLE POSITIONING MECHANISM

Filed Feb. 21, 1961

INVENTOR.
WINFIELD JOHNSTON
BY
ATTORNEY

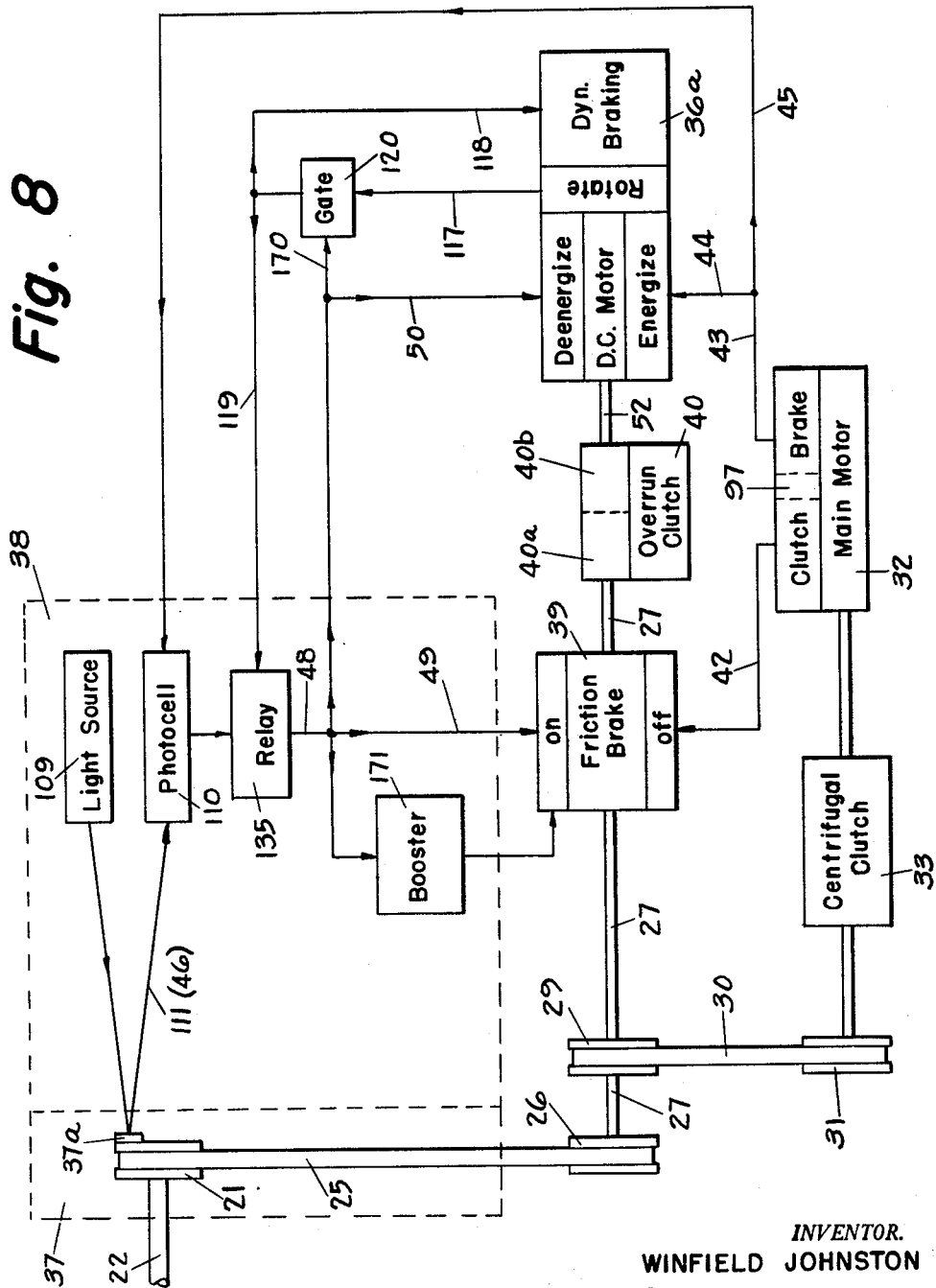

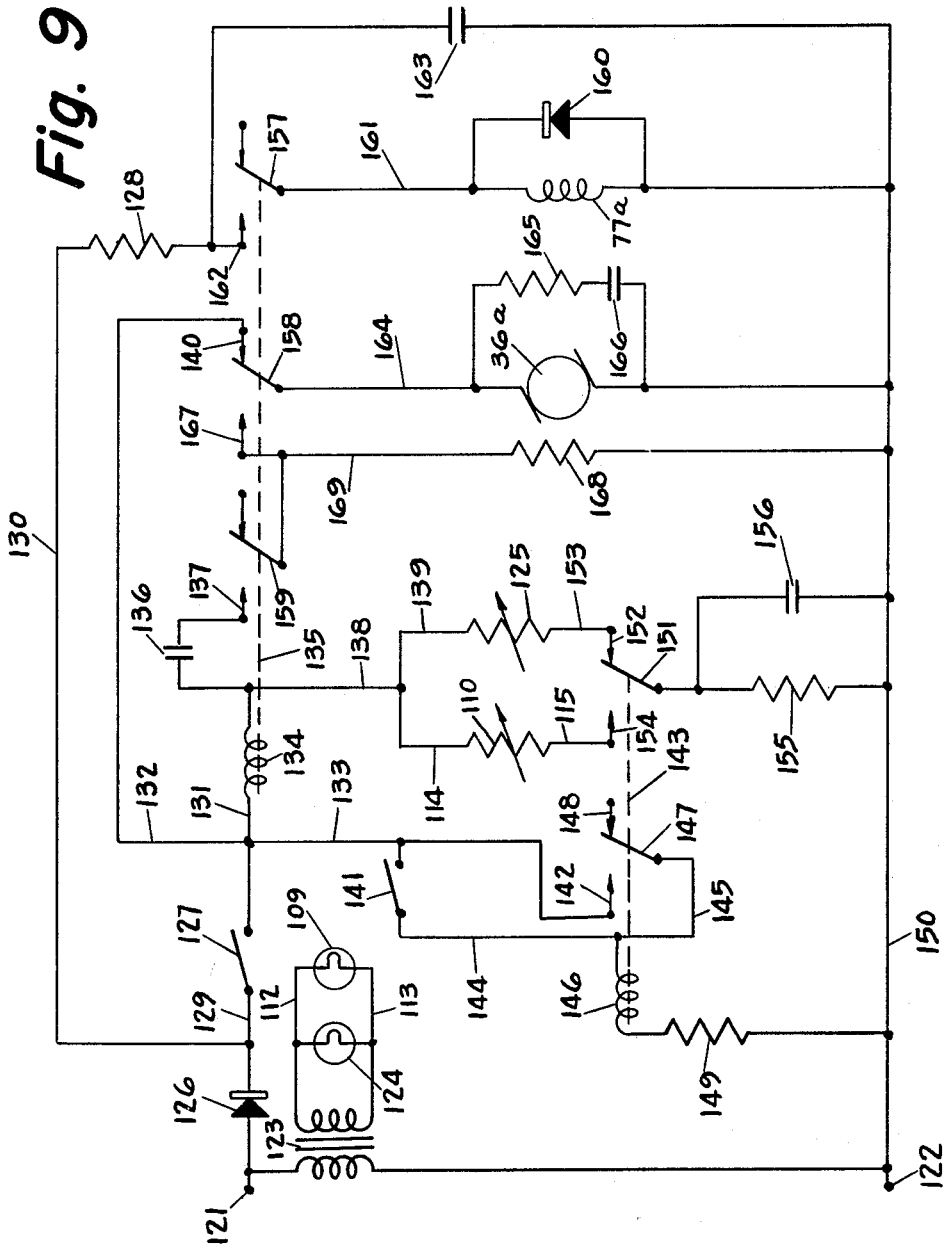

Sept. 22, 1964     W. JOHNSTON     3,149,593
NEEDLE POSITIONING MECHANISM
Filed Feb. 21, 1961     10 Sheets-Sheet 9

INVENTOR.
WINFIELD JOHNSTON
BY
ATTORNEY

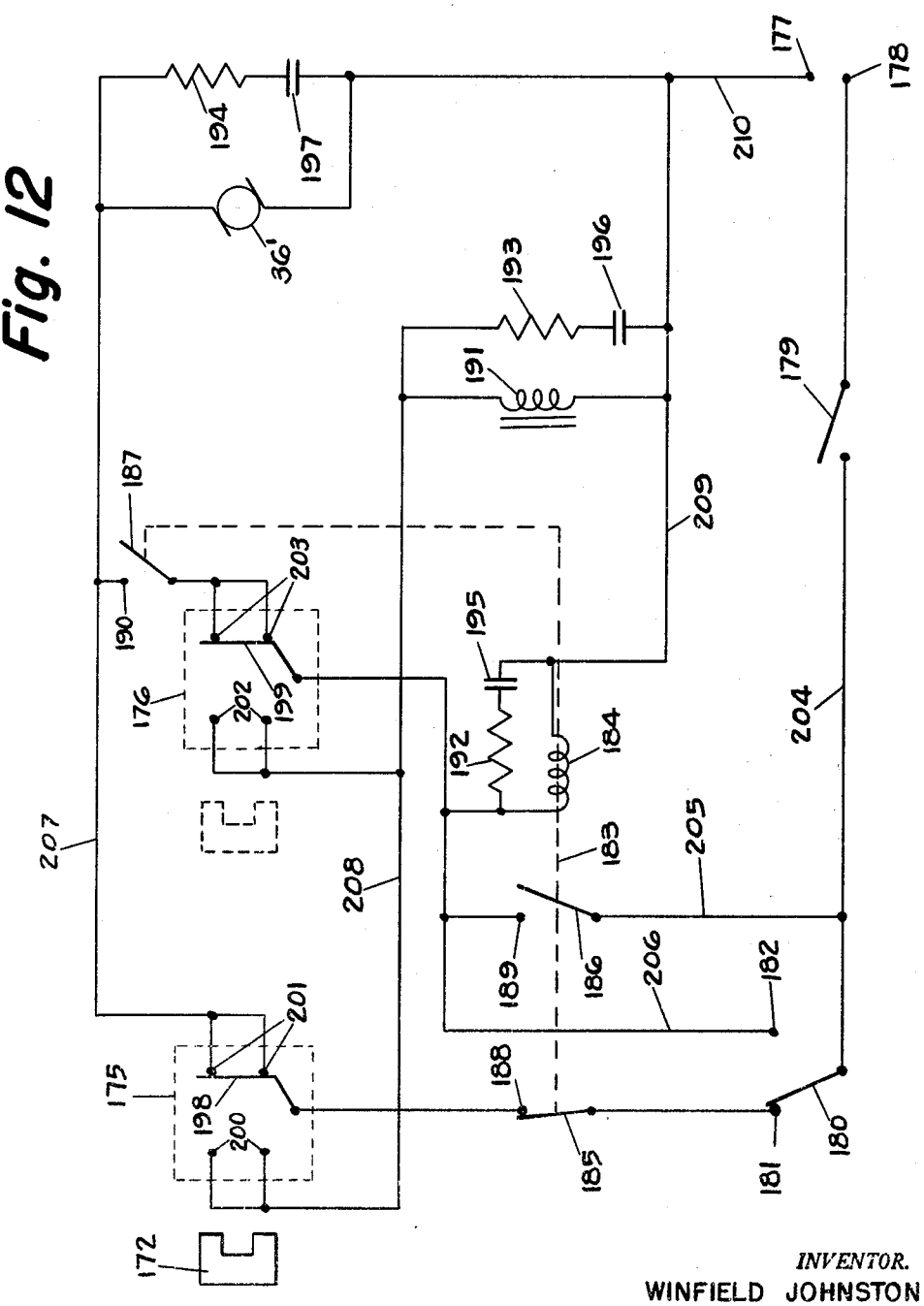

United States Patent Office 3,149,593
Patented Sept. 22, 1964

3,149,593
NEEDLE POSITIONING MECHANISM
Winfield Johnston, Willow Grove, Pa., assignor, by mesne assignments, to American Safety Table Company, Inc., Reading, Pa., a corporation of Pennsylvania
Filed Feb. 21, 1961, Ser. No. 90,737
19 Claims. (Cl. 112—219)

This invention relates generally to intermittently operated utilities and particularly to a power transmission organization operative to terminate operation of the utility when the moving parts thereof are in a predetermined position.

The invention is applicable generally to a wide variety of devices in many different fields, however, one field of application is that of the garment industry wherein power sewing machines are widely used. Generally, in such application, it is required that the sewing machine be intermittently operated, with the periods of non-operation affording an opportunity to shift position of the item being stitched. In such case, it is most desirable that the needle be stopped in its down position so that the work may be readily turned about it. Sometimes, of course, it is most desirable that the needle be stopped in the up position so that the work may be readily removed from the sewing machine.

In the past, the method of placing the needle in the desired position when the machine is stopped has been to rotate the balance wheel of the sewing machine by hand. Hand operation of the balance wheel to achieve desired needle positioning is very time consuming and can represent an appreciable fraction of the labor cost involved in producing a garment. It is therefore of great benefit to the garment industry, and ultimately to the consumer, that labor costs be reduced in the production of stitched articles by eliminating the time wastage associated with the manual positioning of the sewing machine needle. Automatic needle positioning mechanisms have been developed in the art to eliminate this undesirable manual operation of the sewing machine hand wheel, but the known mechanisms for achieving the automatic needle positioning suffers from one or more defects which render them not completely satisfactory for practical use. Generally speaking, these defects in the prior art involve relatively slow speed action of the positioning mechanism, substantial physical bulk associated with the auxiliary apparatus which accomplishes the needle positioning, high cost, unsatisfactory reliability, and non-positive stopping position of the sewing machine needle. The instant invention overcomes all of these difficulties and results in a fast acting, positive positioning, low cost and reliable needle positioning mechanism of relatively small physical size. Accordingly, it is a principal object of this invention to provide a power transmission for driving a utility such as a sewing machine during normal operation, and an auxiliary system cooperatively interacting with the power transmission for automatically moving the working parts of the utility to a selected one of several predetermined positions at the termination of a normal operation.

Another object of this invention is to provide such a needle positioning mechanism which is so interlocked with the main power transmission of the utility that it is permitted to take control of the utility only under certain conditions of operation and is locked out of control under all other conditions.

Yet another object of this invention is to provide a novel power transmission for a sewing machine which achieves extremely rapid positioning of the sewing machine needle by decoupling the needle drive mechanism from the main power transmission and causing the needle to be driven by auxiliary means which are thus not required to control the large rotational inertia associated with the main power transmission but which need control only the relatively low inertia of the sewing machine needle drive.

Still another object of this invention is to provide an automatic needle positioning mechanism which may be coupled to a sewing machine drive in such manner that no physical reworking of the sewing machine itself is required, and in fact, one which may be readily installed on an already existing power driven sewing machine and which utilizes the power transmission that is already associated with the sewing machine for driving the same.

It should be understood that although the invention is described for purposes of illustration in connection with a power sewing machine, the principles involved are generally applicable to a wide variety of devices, and those other applications will be apparent to persons normally skilled in the art. Accordingly, the foregoing and other objects and advantages of the invention will appear more fully hereinafter from an examination of the following detailed description and appended drawings, wherein:

FIGURE 8 is an expanded version of the logical block diagram of FIGURE 1 corresponding in greater detail to the schematic circuit diagram of FIGURE 9;

FIGURE 9 is a schematic circuit diagram corresponding to an arrangement for implementing the logic of FIGURE 8 by employing the indexer-senser system of FIGURE 7;

FIGURE 12 is a schematic circuit diagram corresponding to an alternate arrangement for implementing the logic of FIGURE 1 by employing the indexer-senser system of FIGURES 10 and 11.

In these several figures, like elements are denoted by like reference characters.

Figure 1:
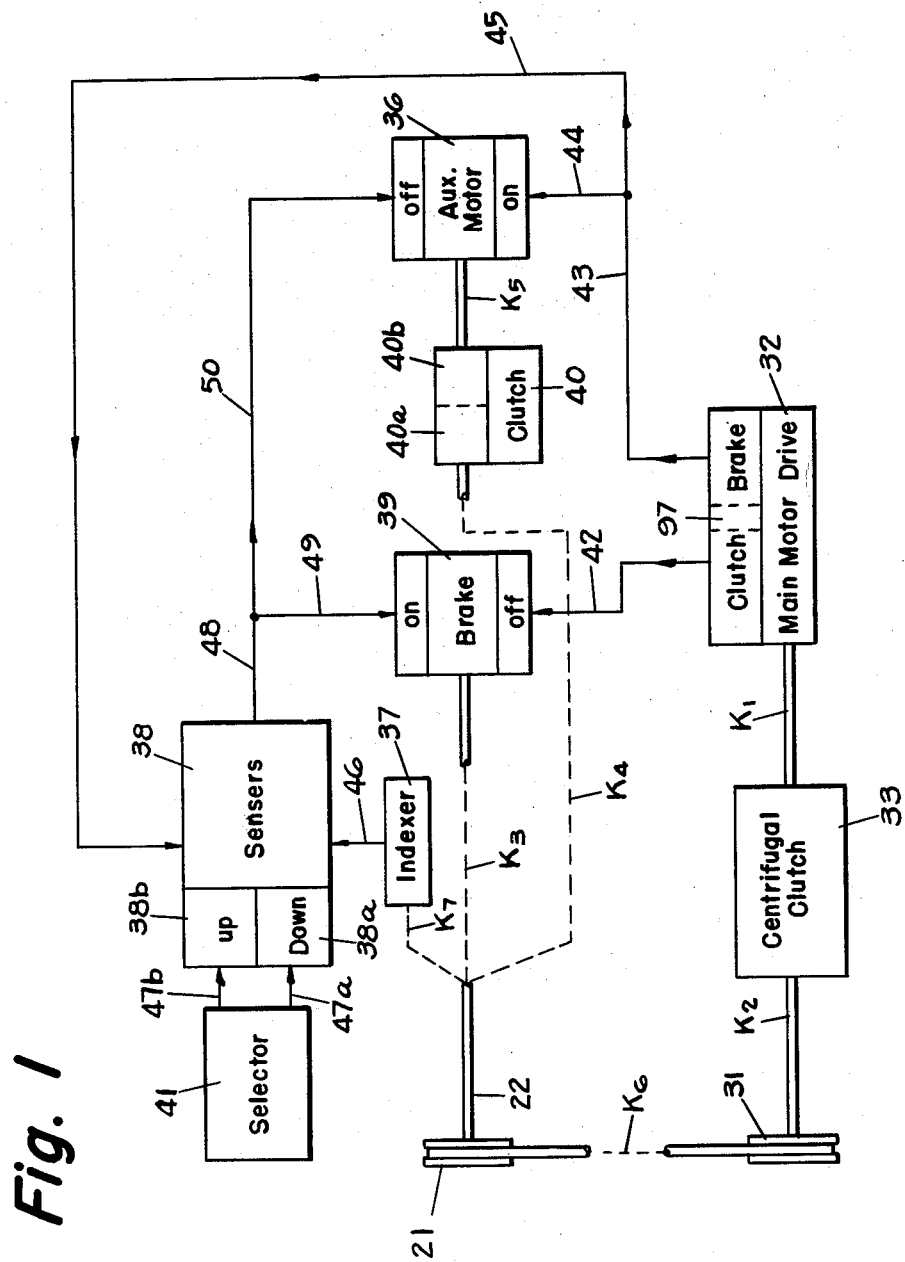
FIGURE 1 is a generalized logical block diagram of the needle positioning system shown in FIGURE 3.

Before describing in detail the various components of the overall sewing machine organization, it will be conducive to a more complete understanding if the general functions and organizational inter-relationships be first explained. In this regard, reference should first be made to FIGURES 1, 2 and 3, and first to FIGURE 1. FIGURE 1 is a generalized logical block diagram of the needle positioning system according to the invention and includes within its general framework the specific embodiment of the apparatus illustrated in FIGURE 3, the more detailed logical block diagram of FIGURE 8 which corresponds precisely to the embodiment of the invention shown in FIGURE 3 being an expansion of the generalized logic of FIGURE 1. The specific logic of FIGURE 8 and the implementing circuitry corresponding thereto will be subsequently described in some detail, however, at the moment attention should be directed to the generalized system of FIGURE 1;

In FIGURE 1, the spindle shaft 22 of the sewing machine is illustrated as being mechanically coupled to the pulley 31 through a mechanical system of linkages including mechanical coupling K6 and the hand wheel pulley 21, the pulley 31 being itself coupled to the main drive 32 by means of the centrifugal clutch 33 and couplings K1 and K2. The couplings K1, K2 and K6 are designated only generally since the particular form which these couplings may take will be determined by a given desired physical system embodiment. By way of illustration, the coupling K6 would correspond to the pair of belts 25 and 30 and pulleys 26 and 29 in the illustrated embodiment of FIGURE 3. The only point of actual significance is that there exists a means of coupling the spindle shaft 22 to the main drive system 32 through the centrifugal clutch 33.

Also coupled to the spindle shaft 22 by means of the couplings K3, K4 and K7 are respectively an auxiliary brake 39, one-half of a clutch 40 and an indexer 37. The indexer 37 indicates the precise angular position at any instant of some given point on the spindle shaft 22 and hence is capable of signaling the exact position of the sewing machine needle 23 shown in FIGURE 3. The auxiliary brake 39 through its coupling K3 to the spindle shaft 22 provides a means for rapidly stopping the rotation of the spindle shaft 22 when the brake is set in response to a control signal. The clutch 40 under certain circumstances couples the auxiliary motor 36 to the spindle shaft 22 through the couplings K4 and K5 and the two halves 40a and 40b of the clutch 40 to thereby enable the auxiliary motor 36 to drive the spindle shaft 22 when the latter has been decoupled from the main motor drive 32. Cooperating with the indexer 37 to provide control signals for the auxiliary brake 39 and auxiliary motor 36 is a sensor device 38 which, as illustratively shown, senses the position of the sewing machine needle when it is in either its up position or its down position, and will generate its control signal to stop the sewing machine needle in either of these two positions as determined by the needle position selector device 41. The system operates in the following manner.

When the main motor drive 32 is clutched into engagement with the spindle shaft 22 to drive the sewing machine needle 23 during a normal sewing operation, a clutch signal is generated and transmitted over the signal path 42 to cause the auxiliary brake 39 to be maintained in an off state so that it exerts no braking action upon the spindle shaft 22. Since the main motor drive 32 is driving the spindle shaft 22, the main brake is not set and no signal appears on the signal paths 43, 44 and 45 so that the auxiliary motor 36 is quiescent and cannot attempt to drive the spindle shaft 22 through the clutch 40 and the associated couplings K4 and K5. Similarly, the absence of a signal on the line 45 deactivates the sensers 38 so that the latter will produce no signal on its output line 48 regardless of the fact that the indexer 37 may be sending needle position signals to the senser 38 over the signal path 46. Consequently, the auxiliary brake 39 remains disengaged.

In a typical sewing machine application, the main motor drive system 32 drives the spindle shaft 22 at high speeds on the order of six thousand revolutions per minute. At such speeds it is not presently possible to sense the needle position and bring the needle to a stop at the desired position in less than one revolution of the spindle shaft. This condition dictates that the spindle shaft speed must be materially reduced before position control is imposed. For this reason, the auxiliary motor 36 is chosen to run at some conveniently lower speed which for purposes of illustration and convenience will be arbitrarily fixed at approximately three-hundred and sixty revolutions per minute. When the auxiliary motor 36 is running it will drive the half 40b of the clutch 40 at this speed through its coupling K5, the other half of the clutch 40, namely 40a, being driven at the speed of the spindle shaft 22 through the coupling K4. By choosing the clutch 40 to be of the overrun type, the conditions can be so arranged that the two halves of the clutch 40a and 40b are decoupled whenever the speed of the spindle shaft 22 is higher than the speed of the auxiliary motor 36 so that the auxiliary motor 36 will only take over rotational control of the spindle shaft 22 when the speed of the latter tends to drop below the aforesaid three-hundred and sixty revolutions per minute.

The constants of the centrifugal clutch 33 are so chosen that when the rotational speed of the main drive 32 falls below a predetermined value, the couplings K1 and K2 become disengaged from one another so that the spindle shaft 22 becomes disengaged from the main drive. Ideally, by causing the centrifugal clutch 33 to disengage the spindle shaft 22 at precisely the rotational speed of the auxiliary motor 36, namely three-hundred and sixty revolutions per minute, there is brought about the situation wherein upon the instant of disengagement of the spindle shaft 22 from the main drive 32 there is simultaneously instant pick-up of the spindle shaft by the auxiliary motor 36 thereby occasioning no delay in transfer of control of the spindle shaft 22 from the main drive to the auxiliary motor drive. As a practical matter, centrifugal clutch 33 will normally be set-up to decouple the spindle shaft 22 from the main drive at a speed slightly lower than the rotational speed of the auxiliary motor 36 in order to insure immediate take over of the spindle shaft by the auxiliary motor upon disengagement from the main drive.

With the foregoing conditions borne firmly in mind, the stopping of the machine with the needle in the desired position will now be readily understood as occurring in the following manner. As previously described, during a normal stitching operation, the spindle shaft 22 is driven by the main motor drive 32 through the centrifugal clutch 33; the auxiliary motor 36 is not running; the auxiliary brake 39 is not engaged with the spindle shaft 22; and the sensers 38 are deactivated. When the operator desires to stop the sewing machine, the clutch of the main drive 32 is disengaged from the motor, as for example by heeling the treadle 35 shown in the apparatus of FIGURE 3, and the main drive brake is engaged. Declutching of the main drive 32 suppresses the signal transmitted over the path 42 to the auxiliary brake 39 and conditions the latter for engagement with the spindle shaft 22 at the appropriate time dictated by the sensers 38. Simultaneously, declutching of the main drive 32 generates a signal on line 43 which turns on the auxiliary motor 36 and activates one of the position sensers 38a or 38b dependent upon which one of these sensers has been conditioned by the selector 41 via the selector output lines 47a or 47b.

At the same time, the speed of the spindle shaft 22 is being rapidly reduced by the main drive brake. As the speed of the spindle shaft 22 passes through the throw-out speed of the centrifugal clutch 33, the spindle shaft 22 is disengaged from the main drive 32 and is coupled to and rotated by the auxiliary motor 36 through the now engaged halves 40a and 40b of the clutch 40. As the sewing machine needle approaches its desired stop position, the spindle shaft indexer 37 transmits a signal over the line 46 to the activated sensor 38a or 38b which produces a signal on its output line 48. This output signal is transmitted over the signal path 50 to turn off the auxiliary motor 36, and over the signal path 49 to set the auxiliary brake 39 and bring the needle to a stop at the desired position. Upon the resumption of sewing, the auxiliary brake 39 is released, and the spindle shaft 22 is picked up for high speed rotation by the main motor drive 32 when the speed of the latter passes upward through the pull-in speed of the centrifugal clutch 33.

Figure 2:
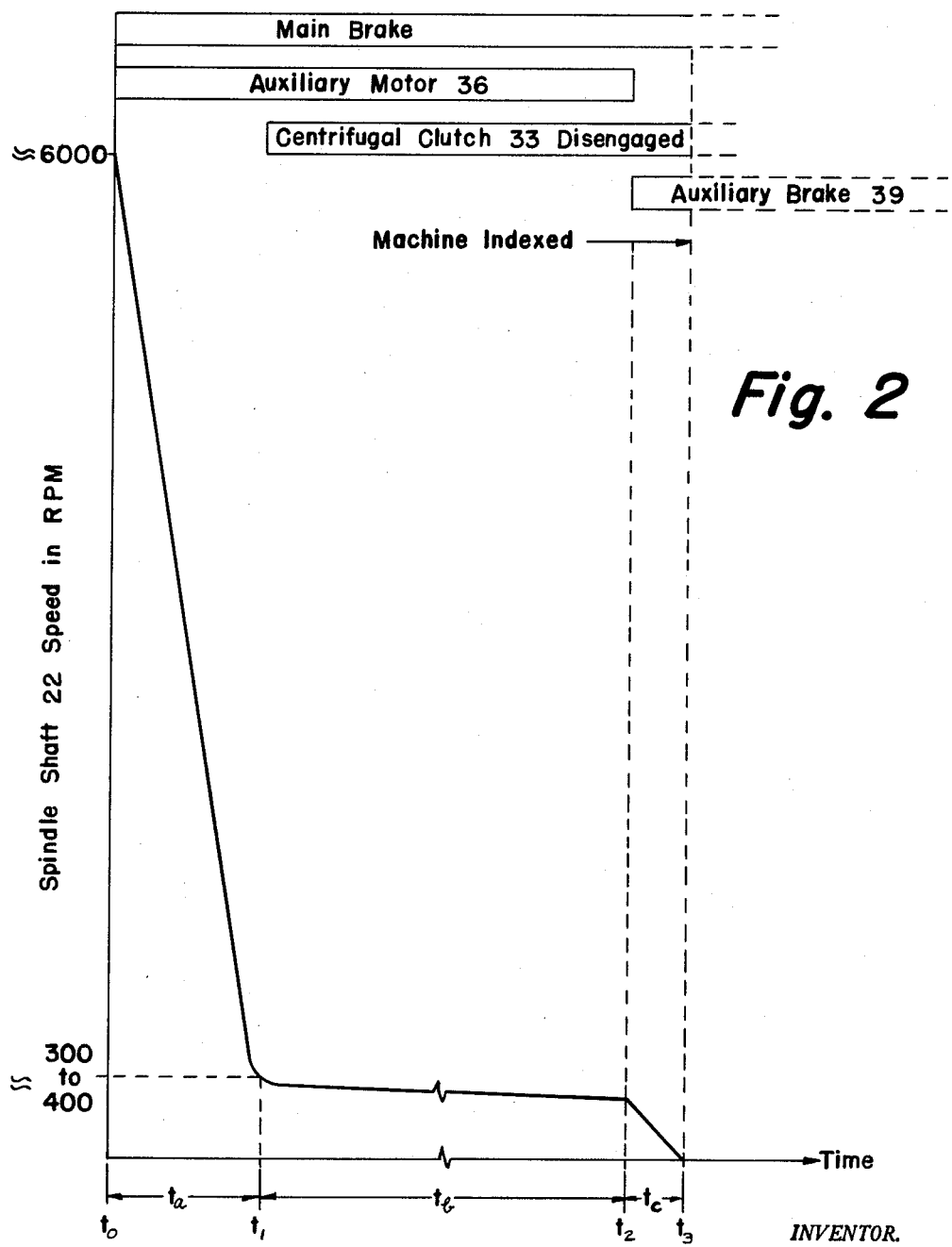
FIGURE 2 is a graph of sewing machine spindle shaft rotational speed versus time as a function of various system elements shown in FIGURE 3 which operate on the spindle shaft to provide needle stopping at a predetermined position.

FIGURE 2 illustrates in graphic form the sequence of events resulting in final stoppage of the needle in its predetermined position upon declutching of the main drive clutch from the main motor. Upon setting of the main brake at time $t_0$ the time interval $t_a$ is initiated during which the spindle shaft speed is rapidly reduced from the relatively high six thousand revolutions per minute to the much lower speed of approximately three-hundred and sixty revolutions per minute occurring at time $t_1$. At $t_1$ the centrifugal clutch 33 disengages the spindle shaft 22 from the main brake and allows the auxiliary motor 36 to take over driving control of the spindle shaft for the time interval $t_b$. At $t_2$ the indexer 37 transmits its signal to the sensors 38 which deenergizes the auxiliary motor 36 and applies the auxiliary brake 39, thus initiating the auxiliary braking interval $t_c$ which terminates at time $t_3$ when the spindle shaft 22 has come to a complete stop in the desired indexed position.

The duration of the time interval $t_a$ is, of course, a function of the braking efficiency of the main brake and is beyond the control of the needle positioning mechanism according to the invention. In a typical case, the time interval $t_a$ may approximate forty milliseconds. The interval $t_b$, during which time the spindle shaft is being driven at constant speed by the auxiliary motor 36, is indicated by the time-base line-break to be of variable duration. This time variability occurs by virtue of the fact that there is no way of knowing what position the needle of the sewing machine occupies at the instant when the auxiliary motor 36 takes control of the spindle shaft 22. If for example, it is desired to stop the sewing machine needle in its down position, and at the moment of transfer $t_1$ the needle has just passed through its down position sensing region, then the indexer 37 will not transmit a signal to the senser 38a and the spindle shaft 22 will necessarily have to be rotated through the major portion of one complete revolution before the indexer is again in a position to transmit a signal to the appropriate senser. At a rotation rate of three-hundred and sixty revolutions per minute this time interval may amount to one-hundred and fifty milliseconds. On the other hand, should the indexer 37 transmit its signal to the senser 38a at about time $t_1$ because the needle is just approaching its proper position, then substantially no rotation whatever of the spindle shaft 22 is required and the time interval $t_b$ reduces to zero. Obviously, the duration of the interval $t_b$ may be anywhere between zero and the time required for substantially one complete revolution of the spindle shaft 22. Finally, the auxiliary braking time interval $t_c$ will be a function of the efficiency of the auxiliary brake 39 and the time interval occurring between transmission of the indexing signal from the indexer 37 and the setting of the brake 39. Typically, the time interval $t_c$ may range between ten and fifteen milliseconds. A summation of the maximum duration of the time intervals $t_a$, $t_b$ and $t_c$ yields approximately two-hundred milliseconds, or two-tenths of one second, which for all practical purposes represents instantaneous stopping of the sewing machine needle in the desired indexed position.

Figure 3:
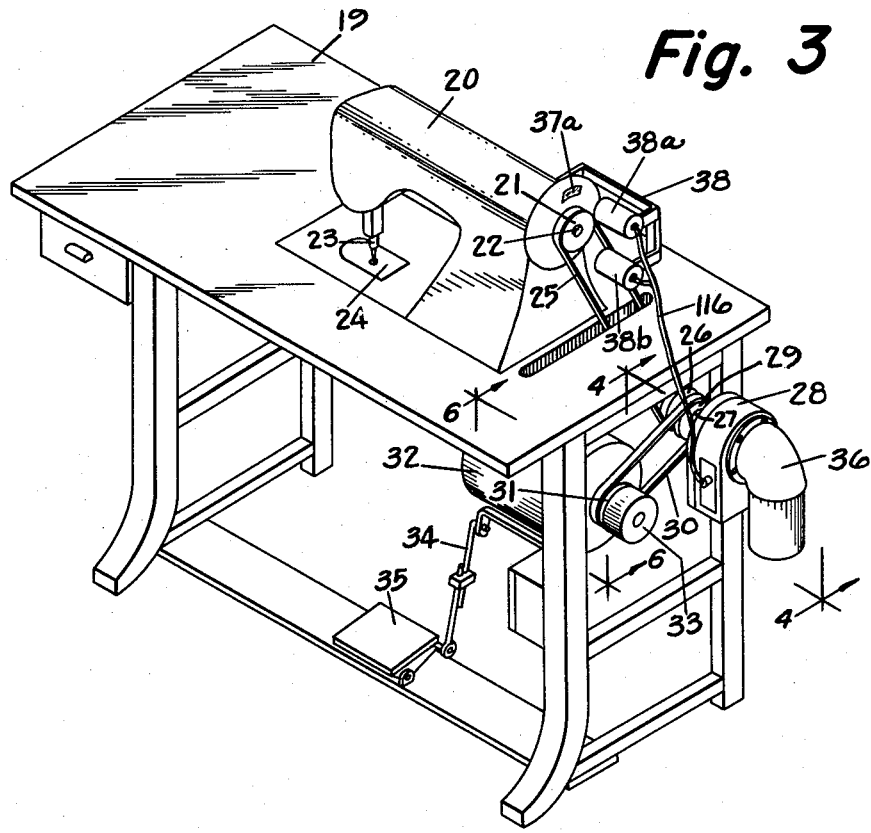
FIGURE 3 is a perspective view of a sewing machine of the manufacturing type constructed in accordance with and embodying the general principles of the invention.

Understanding now the basic logic of the needle positioning system according to the invention, attention should be directed to FIGURES 3 through 7 for structural and organizational details of one possible form of the auxiliary brake 39, auxiliary motor 36, clutch 40 and the main drive 32 and centrifugal clutch 33, all as embodied in the general organization of the showing of FIGURE 3 to which reference should now be made.

*General Organization*

FIGURE 3 illustrates an apparatus constructed in accordance with and embodying the general principles of the invention. In FIGURE 3, there will be seen a sewing machine 20 mounted upon a table or work stand 19, the sewing machine 20 being fitted with the usual hand wheel and pulley 21 mounted at the right-hand end of the machine upon the spindle shaft 22 and having a belt 25 trained thereabout for driving the needle bar and needle 23 through its internal coupling to the spindle shaft 22. The needle 23, of course, reciprocates in a vertical direction as the spindle shaft 22 rotates, one complete cycle of vertical oscillation of the needle 23 corresponding to one complete revolution of the spindle shaft. On its downward stroke, the needle 23 passes in the usual manner downward through the throat in the cloth plate 24 which underlies the needle position. The belt 25 trained about the hand wheel pulley 21 passes downward through a slot in the table 19 and about a pulley 26 commonly mounted on a shaft 27 with another pulley 29. Trained about the pulley 29 is a second belt 30 which also passes about the pulley 31 which is rotatably driveable by the main power driving unit 32 through the medium of a centrifugal clutch 33.

The main power drive 32 includes within itself a continuously running main driving motor and a fixed brake, the pulley 31 being selectively clutched into engagement with the main motor for driving the sewing machine or being shifted into engagement with the fixed brake by a clutch-brake mechanism within the main drive unit 32 which is coupled to the pulley 31 through the centrifugal clutch 33. The internal clutch-brake mechanism of the main power drive 32 is shifted between its driven position and its brake position by means of the foot treadle 35 acting through a linkage 34. Since the pulleys 26 and 29 about which are trained respectively the belts 25 and 30 are fixed upon a common rotatable shaft 27, it will be understood that driving or braking of the pulley 31 will result in a corresponding driving or braking of the hand wheel 21 and hence of the needle bar and needle 23.

The rotatable shaft 27 extends to the right into a housing 28 and is coupled therein to the rotatable drum of an auxiliary brake 39 and to one-half of an overrun clutch 40, the other half of the overrun clutch 40 being coupled to an auxiliary motor 36. The auxiliary brake 39 and the overrun clutch 40 are, of course, not visible in the showing of FIGURE 3 but will be described in some detail in connection with the detailed figures 4, 5, 10 and 11. As will subsequently be seen, the auxiliary brake 39, overrun clutch 40 and auxiliary motor 36 bear the responsibility for driving the needle 23 to a particular desired position and stopping in thereat under the control of a needle position sensing system which is generally indicated at 37 and 38 in close association with the hand wheel 21.

The element 37a is illustrated as a reflective strip of material which is secured to the hand wheel 21a and rotates therewith, the particular positioning of the strip 37a on the periphery of the hand wheel 21a being such that it cooperates with a sensing device 38 to signal one or more predetermined positions of the needle 23. Thus, the reflective strip 37a performs the function of a needle position indexer, and in the illustrated case takes the form of a reflective strip because the illustrated needle position senser 38 is intended to generally represent a photocell sensing device and a light beam source, the sensing device generating a signal when it receives a light pulse reflected from the light source by means of the reflecting strip indexer 37a on the hand wheel 21a. This indexer senser system is representationally illustrated in enlarged form in the showing of FIGURE 7 and will be subsequently described in somewhat more detail. A needle position selector mechanism 41, to be subsequently described, is utilized in conjunction with the sensing system 38 to establish which one of several needle stopped positions it is desired to select at a given time. The selector 41 is also not specifically seen in the general organizational showing of FIGURE 3 since its physical position is of no importance whatever, and it may conveniently be enclosed within the housing 28 if so desired. While in FIGURE 3, for purposes of convenient illustration, the needle position indexing and sensing system is generally represented as a photo-responsive device, the invention is not intended to be limited to such a system, and in this regard an alternative needle position indexing and sensing system will also subsequently be described.

Regardless of the particular form taken by the needle position indexing and sensing system, the centrifugal clutch 33 which interposes the pulley 31 and the main drive and brake system 32 is always employed and plays a significant role in the ability of the apparatus according to the invention to achieve extremely rapid positioning of the needle in the desired stopped position. The function of the centrifugal clutch 33, as previously pointed out, is to decouple the pulley 31 from the main drive and brake system 32 when the speed of the spindle shaft 22 drops below some predetermined value as for example three to four-hundred r.p.m., and allow the auxiliary motor 36 to take over control of spindle shaft rotation. The rationale behind this mode of operation is that the auxiliary motor 36 in such circumstance does not have to work against the drag normally applied by the main brake.

*The Auxiliary Motor 36, the Auxiliary Brake 39, and the Overrun Clutch 40*

Figure 4:
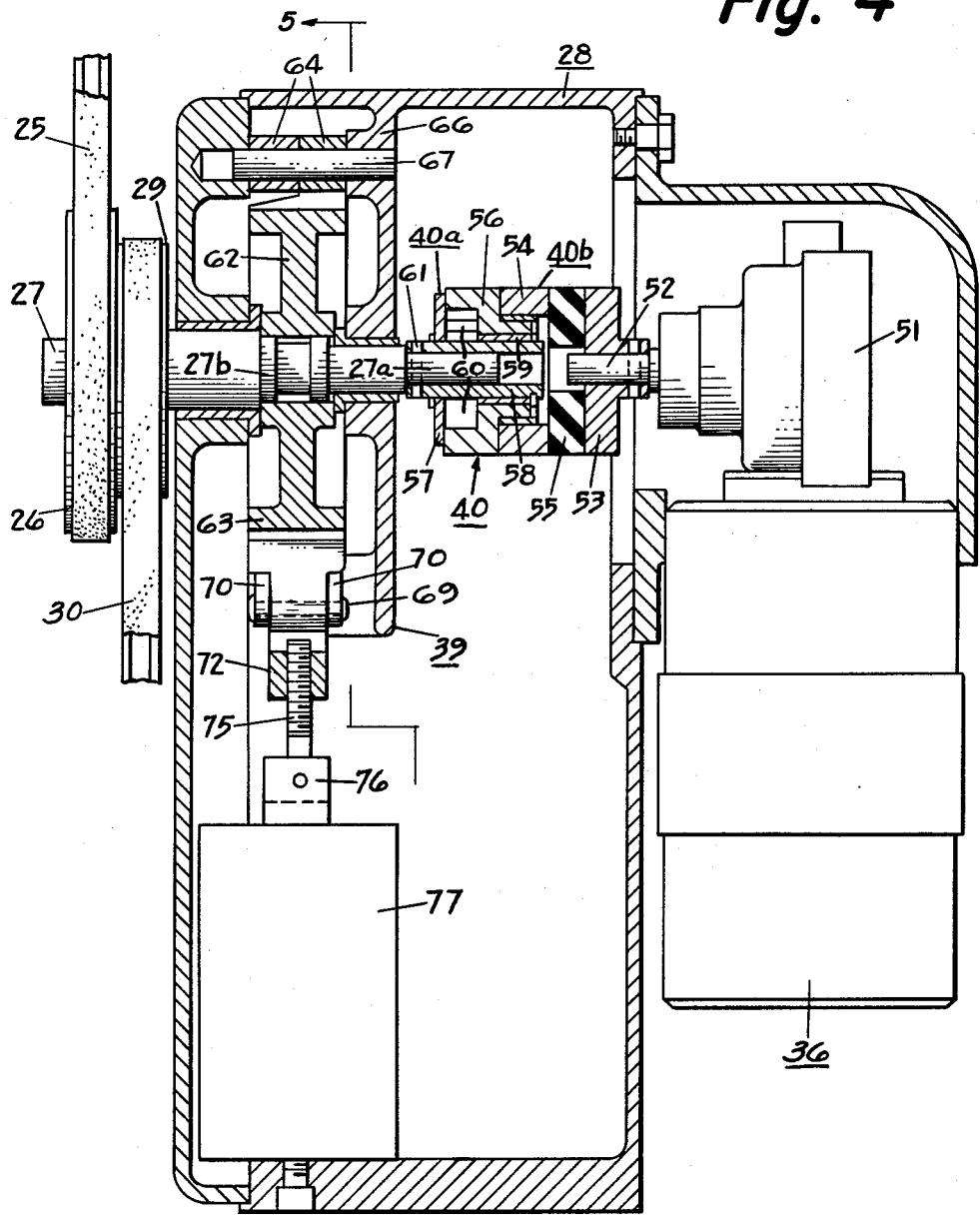
FIGURE 4 is an enlarged vertical section through the auxiliary drive system of the needle positioner mechanism as would be seen when viewed along the lines 4—4 of FIGURE 3, and shows the inter-organization of the auxiliary motor, auxiliary brake and interposing clutch.

Referring first to FIGURE 4, it is observed that the auxiliary motor 36 is coupled to the shaft 52 of one-half 40b of the overrun clutch 40 through a speed reducer 51. The remainder of the half 40b of the overrun clutch 40 consists of the parts 53 and 54 intercoupled by an intervening shock absorbing coupling 55, and the coupling part 56. The clutch parts 53–56 are physically coupled together and to the shaft 52 for rotation as a unit when driven through the speed reducer 51 by the auxiliary motor 36. The other half 40a of the overrun clutch 40 is formed by the end disc 57 and the sleeve 58 upon which it is secured. A sleeve bearing 59 intervenes the sleeve 58 of the clutch half 40a and the part 56 of the clutch half 40b. Also intervening the sleeve 58 and the part 56 are a plurality of sprags 60 which, in the usual manner, allow the sleeve 58 to rotate freely in one direction relative to the part 56, but which lock the part 56 and sleeve 58 together during relative rotation in the opposite direction. The shaft 27 which mounts the pulleys 26 and 29 extends through the left-hand end of the housing and terminates in a reduced right end portion 27a disposed within the sleeve 58 and secured to the latter by means of the pins 61. The sleeve 58 is thus coupled to the spindle shaft 22 so that during a normal stitching operation the sleeve 58 is rotating at a high rate of speed while the part 56 remains relatively motionless and no coupling between the two parts exists. When, however, during braking, the part 56 is rotated by the auxiliary motor 36 and the rotational speed of the sleeve 58 drops off to the point where it is rotating more slowly than the part 56 (even though in the same direction), an effective reversal of rotation takes place between the two parts, they lock together, and the sleeve 58 is driven by the auxiliary motor 36 which latter thereby drives the spindle shaft 22.

Figure 5:
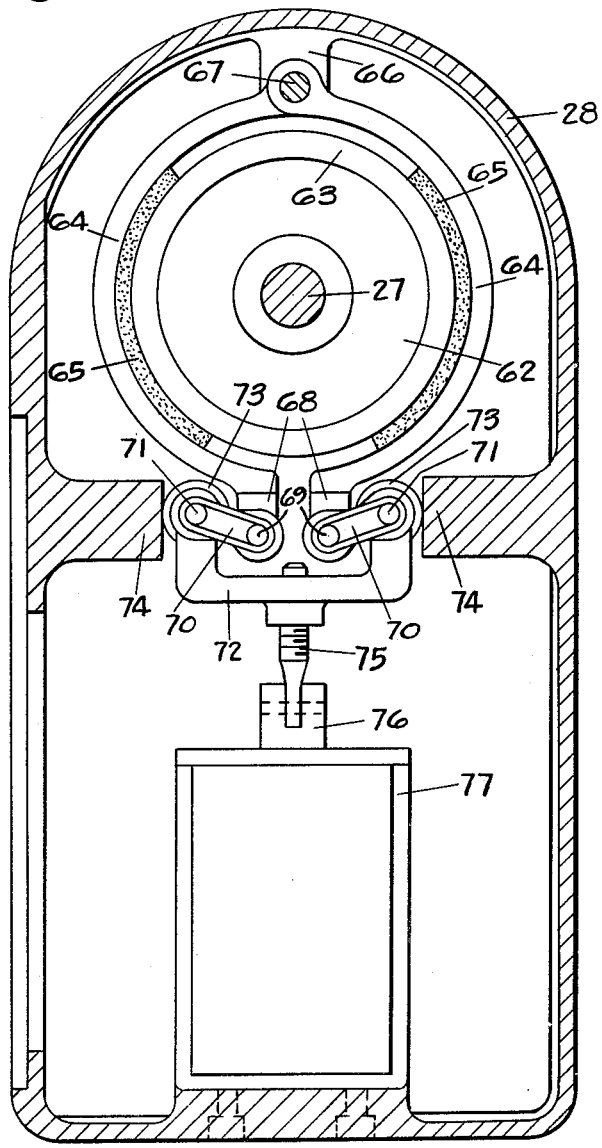
FIGURE 5 is a cross-sectional view through the auxiliary drive system as would be seen when viewed along the lines 5—5 of FIGURE 4, and shows the details of the auxiliary brake for the spindle shaft.

Disposed immediately to the left of the overrun clutch 40 and within the housing 28 is the auxiliary brake 39, additional details of which are shown in FIGURE 5 and to which reference should be made conjointly with the showing of FIGURE 4. Secured upon the portion 27b of the shaft 27 and rotatable therewith is a revoluble brake drum 62 formed with a broad outer peripheral rim 63 having a cylindrical outer surface. Disposed about the outer cylindrical surface of the brake drum rim 63 in spaced relation thereto are a pair of curved brake arms 64 each of which carries a brake shoe 65 adapted to be moved into frictional bearing engagement with the cylindrical surface of the brake drum rim when it is desired to apply the brake and stop the rotation of the shaft 27. Each of the brake arms 64 is pivotally pin connected at its upper end to an internal formation 66 of the housing 28 by means of the pin 67, and each of the brake arms 64 terminates at its lower end in a vertically disposed terminal part 68.

The terminal parts 68 of the brake arms 64 are each pivotally connected as at 69 to one end of the links 70, the opposite ends of which links are pivotally connected as at 71 to the opposite arms of a generally U-shaped yoke 72. The pivot connections 71 also each carry a roller 73, the rims of which rollers outwardly press against a pair of smooth-faced roller guides 74 projecting inward from opposite sides of the housing 28 and upon which guides the rollers are adapted to roll in a vertical sense. Secured to and depending from the central portion of the base of the U-shaped yoke 72 is a stud 75 which is itself coupled to the plunger 76 of an electrically actuated solenoid 77. When the solenoid 77 is de-energized, the plunger 76 is upwardly biased by an internal spring (not shown) which drives the yoke 72 vertically upward and causes the lower terminal portions 68 of the brake arms 64 to pivot outward sufficiently to disengage the brake shoes 65 from the surface of the revoluble brake drum rim 63, thus disengaging the brake and imposing no restraint upon rotation of the shaft 27 and the spindle shaft 22 which is coupled thereto through the belt 25 and pulley 21. When, however, the solenoid 77 is energized, the plunger 76 moves downward drawing with it the yoke 72. The rollers 73 move down along the smooth faces of the guides 74 and through the medium of the links 70 cause the pivots 69 to move inward toward one another, carrying the terminal portions 68 of the brake arms 64 with them and firmly pressing the brake shoes 65 against the rim 63 of the revoluble brake drum 62 to rapidly brake the shaft 27 to a stop. The sewing machine spindle shaft 22 is, of course, simultaneously braked by virtue of its coupling to the shaft 27. Energization and deenergization of the solenoid 77 is effected at the appropriate times by means of the control circuitry to be described in connection with the schematic diagram of FIGURE 9.

From the foregoing, it will be appreciated that the couplings K3 and K4 shown in the logical block diagram of FIGURE 1 in fact couple the auxiliary brake 39 and the half 40a of the overrun clutch 40 to the shaft 22 through the pulley 21 by means of the shaft 27, pulley 26 and belt 25 shown in the embodiment of FIGURES 3 and 4, and that the coupling K5 between the auxiliary motor 36 and the half 40b of the overrun clutch 40 corresponds to the speed reducer 51 and shaft 52 as seen in FIGURE 4. The belt 30 trained about the pulley 29 which is fixed upon the shaft 27 extends downward and is trained about the pulley 31 associated with the main drive system 32 and by means of which the spindle shaft 22 of the sewing machine is normally driven. Structural details of the main drive system are illustrated in FIGURE 6 to which reference should now be made.

*Main Drive 32 and Centrifugal Clutch 33*

Figure 6:
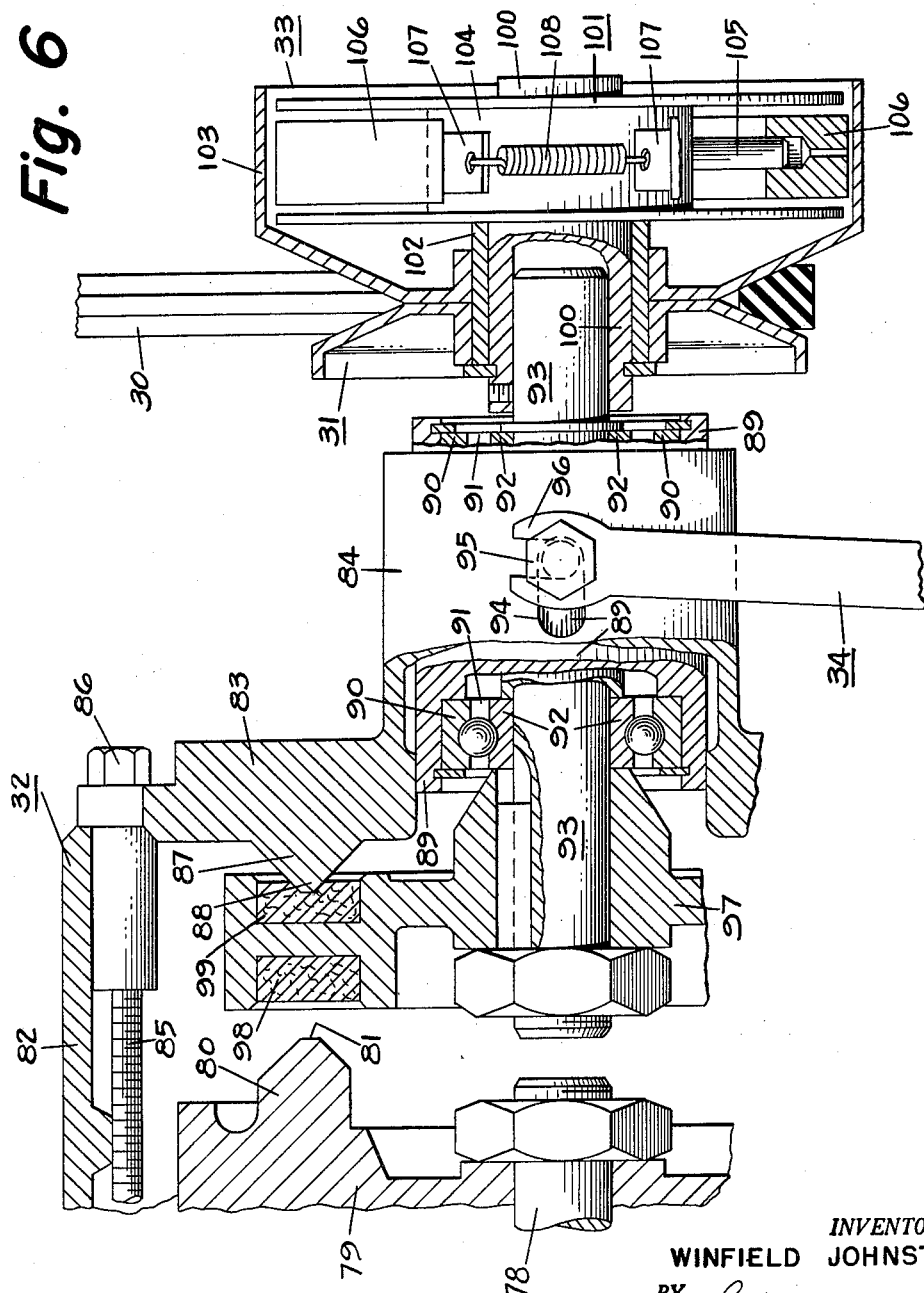
FIGURE 6 is an enlarged vertical section through the main drive and brake system for the spindle shaft as would be seen when viewed along the lines 6—6 of FIGURE 3, and shows also the centrifugal clutch arrangement for coupling and decoupling the spindle shaft and main drive systems.

Referring now to FIGURE 6, the main drive organization 32 comprises a main motor (not shown) having a rotor shaft 78 extending to the right and upon which is fixedly secured for rotation therewith a flywheel 79. Formed on the right-hand face of the flywheel 79 is an annular rib 80 of generally triangular shape in transverse cross section, so formed to provide it with a relatively sharp outer edge 81. The main motor and its associated flywheel 79 are carried by and supported within a housing 82 in a fixed position but with the flywheel centered within the housing and free to rotate therewithin. The right-hand end of the housing 82 is closed by a circular disc portion 83 having a centrally located cylindrical journal portion 84 formed integrally therewith, the disc 83 and journal 84 being fixedly secured to the housing 82 by a plurality of bolts 85 and nuts 86, one of each of which is shown in FIGURE 6. Formed on the inner face of the end disc 83 is an annular rib 87 also of generally triangular shape in transverse cross section so as to form a relatively sharp edge 88.

Close fittingly disposed within the cylindrical journal 84 and axially slidable therewithin is a sleeve 89 which carries the outer races 90 of a pair of axially spaced ball bearings 91, the inner races 92 of which are fitted upon an axially shiftable rotatable shaft 93 disposed in spaced apart co-axial alignment with the main motor shaft 78 upon which the flywheel 79 is secured. The journal 84 within which is disposed the slidable sleeve 89 is provided at diametrically opposite sides thereof with elongated openings 94 through which respectively project a pair of studs 95 secured at their inner ends to the slidable sleeve 89. Cradled about the studs 95 are the upper terminal arms 96 of the downwardly extending treadle linkage system 34, the linkage system 34 being operable in the usual manner by means of the treadle 35 seen in FIGURE 3 to shift the studs 95 axially within the slot 94 of the fixed position journal 84 so that the shaft 93 may be axially displaced to the left or to the right. When the treadle 35 is depressed the shaft 93 is shifted leftward and when the treadle 35 is heeled the shaft 93 is right-shifted.

Keyed upon the left-hand end of the shaft 93 for rotation therewith is a clutch and brake disc 97 provided adjacent its peripheral edge with a pair of opposite facing annular friction discs 98 and 99, the disc 98 being adapted for engagement with the fly-wheel annular rib 80 when the shaft 93 is left-shifted and the disc 99 being adapted for engagement with the annular rib 87 when the shaft 93 is right-shifted. Engagement of the disc 98 with the rib 80 of the flywheel 79 clutches the shaft 93 to the main drive motor and causes it to rotate at high speed. Engagement of the disc 99 with the fixed position annular rib 87 rapidly dissipates the rotational energy of the shaft 93 and thus causes a braking action to occur. The clutch disc 98 and brake disc 99 are, of course, alternatively, and not simultaneously engageable with their associated driving rib 80 and braking rib 87 to rotatably drive or brake the shaft 93 under the control of the foot treadle 35.

Keyed or otherwise suitably secured upon the right-hand end of the shaft 93 which extends beyond the sleeve 89 is a sleeve 100 and a bobbin type assembly 101 which together comprise the half of the centrifugal clutch 33 which is directly coupled to the main drive 32. Close fittingly rotatably disposed about the sleeve 100 is a sleeve 102 upon which is fixedly secured the pulley 31, it being thus understood that the pulley 31 is effectively freely rotatably disposed upon the shaft 93 through the intervening sleeves 101 and 102. The remaining half of the centrifugal clutch 33 is formed by the hollow cylindrical portion 103 disposed peripherally about the centrifugal clutch bobbin portion 101 and which is seen to be formed integrally with and as a part of the pulley 31. The centrifugal clutch bobbin portion 101 includes a central hub portion 104 from which radially extend guide pins 105 upon which are disposed for radial shifting motion a pair of arcuate clutch shoes 106 located diametrically across the hub 104 from one another. Each of the shoes 106 is provided with terminal ears 107 affixed thereto at opposite ends of the shoes, the terminal ears 107, and hence the clutch shoes 106, being radially biased inward toward one another by a pair of tension springs 108 interconnecting the terminal ears.

The spring constant of the tension springs 108 is chosen so that below a predetermined rotational speed of the shaft 93, the centrifugal force exerted upon the clutch shoes 106 is insufficient to overcome the inward directed spring force and the clutch shoes 106 are prevented from moving outward to clutchingly engage the inside surface of the hollow cylindrical portion 103 of the pulley 31. Hence, below this predetermined rotational speed of the shaft 93 there exists no coupling between the pulley 31 and the rotating shaft. However, when the rotational velocity of the shaft 93 exceeds the predetermined value the springs 108 are no longer able to overcome the centrifugal force exerted upon the clutch shoes 106 and these shoes move radially outward and clutchingly engage the pulley 31 with the shaft 93 to thereby drive the belt 30 and ultimately the spindle shaft 22. The centrifugal clutch structure illustrated in FIGURE 6 and just described is not intended to necessarily correspond to the actual structure of a centrifugal clutch but has been presented in the manner shown for purposes of ease of understanding, although the simplified showing does accurately illustrate the operating principles of clutches of this type.

From the foregoing it should be now clear that the pulley 31 and sewing machine spindle shaft 22 are coupled to the rotatable shaft 93 above the predetermined rotational speed through the centrifugal clutch 33 regardless of whether the shaft 93 is being driven by the flywheel 79 or is being braked by the annular rib 87, and that below the predetermined speed the pulley 31 and spindle shaft 22 are disengaged from the rotating shaft 93, again quite independently of whether the shaft 93 is being driven or is being braked.

Sensers 38

Figure 7:
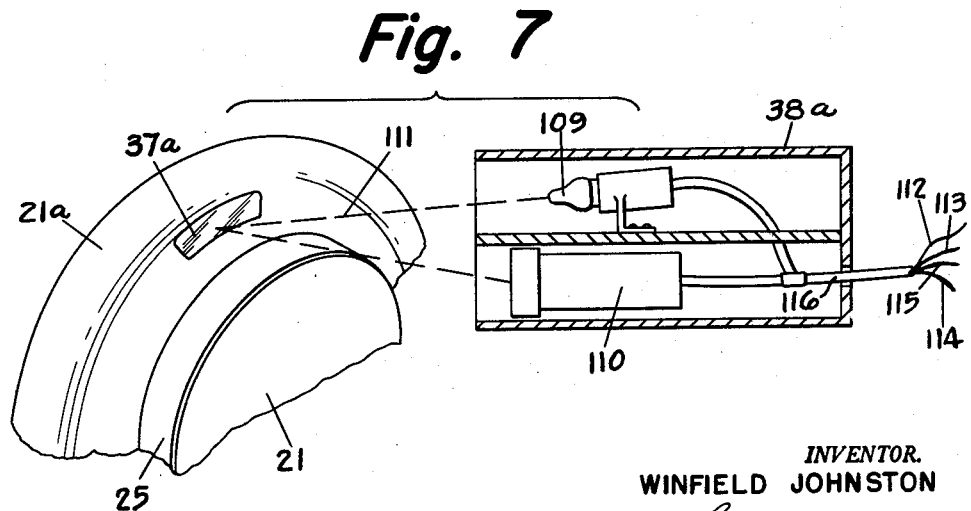
FIGURE 7 illustrates in enlarged form, partly in perspective and partly in section, one form of indexer-senser system associated with the sewing machine hand wheel for determining needle position.

FIGURE 7 illustrates in enlarged diagrammatic form the photocell type sensing system embodied in the organization of FIGURE 3. In this system the indexer 37 takes the form of a reflective strip fixed to the hand wheel portion 21a near its periphery and rotatable therewith so that there is a fixed relationship to the spindle shaft 22 and hence to the needle 23. Disposed to the right of the hand wheel 21a is the "up" needle position senser unit 38b which includes within the housing a light source 109 and a light responsive photocell 110. The light source 109 is focused to direct a light beam 111 to a particular position in space through which passes the circular path traced by the reflective strip 37a as it rotates on the hand wheel 21a. The photocell 110 is so positioned that the light beam 111 will be reflected directly thereinto upon striking the reflective strip indexer 37a, the photocell environment being so controlled, as by collimators or other well known devices, that ambient light is excluded or at least sufficient suppressed to fall below the threshhold level of the photocell and hence render the photocell 110 non-responsive to random light signals and responsive only to the light beam 111.

The light source 109 is energized by means of a pair of conductors 112 and 113, and the photocell 110 is selectively energizable by means of a second set of conductors 114 and 115, these conductors 112 through 115 being enclosed within a cable 116 which runs down to the housing 28 for connection to the control circuitry conveniently located therein. The "up" position sensing unit 38b is, of course, identical to the "down" position senser 38a excepting that it is physically positioned relative to the hand wheel 21a in such manner that it senses the reflective strip 37a when the latter rotates into position corresponding to the up position of the needle 23. Obviously, the needle 23 may be stopped at any desired position by properly positioning the sensing units 38a or 38b, or by employing additional sensers similar thereto. The circuitry associated with the selector 41 in such a case will, of course, be expanded to provide the ability to select any such additional desired needle stopping positions.

The minimum length of the reflective strip 37a, as will come to be understood from considerations of the schematic diagram of FIGURE 9, is a function of the achievable stopping time of rotation of the hand wheel 21a after application of the auxiliary brake 39, because as will be seen, the hand wheel must stop in such a position that the light beam 111 is directed into the photocell 110. By way of illustration, if the auxiliary brake 39 is capable of stopping the hand wheel 21a within thirty degrees of rotation thereof, then the length of the reflective strip 37a must cover at least thirty degrees of arc. Because of the fact that the tip of the needle 23 oscillates vertically with simple harmonic motion, and the further fact that the needle may be considered stopped in its proper position if it comes to rest within approximately one-eighth of an inch of its topmost or bottom-most points of travel, the length of the reflective strip 37a may be expanded to cover substantially ninety degree of arc. By so increasing the length of the reflective strip 37a, the probability of obtaining a needle stopped position on the first revolution of the spindle shaft 22 after take over by the auxiliary motor 36 is materially increased.

*Circuit Description*

Consider now the schematic circuit diagram of FIGURE 9 together with the expanded logical diagram of FIGURE 8 which corresponds thereto. Examination of FIGURE 8 shows that the organization of the main motor drive 32, auxiliary brake 39, overrun clutch 40 and auxiliary motor 36a with the spindle shaft 22, corresponds generally to the organization shown in the logical block diagram of FIGURE 1 and corresponds specifically to the illustrative embodiment of FIGURES 3 through 7 previously described. Additionally, the signal lines 42 through 50 of FIGURE 1 have their counterparts in the showing of FIGURE 8, the signal line 46 of FIGURE 1 being the light beam 111 of FIGURE 8 and being so designated. While the general auxiliary motor 36 of FIGURE 1 may be either an A.C. or a D.C. motor, the motor 36a of FIGURES 8 and 9 is shown as being a D.C. motor and is employed so that the desirable feature of dynamic braking thereof may be utilized. In the event that an A.C. motor is used in place of the D.C. motor indicated as 36a in the showing of FIGURE 8, the only changes involved would be the elimination of the signal lines 117, 118, 119, the gate structure 120, and those parts of the motor structure 36a designated as "rotate" and "dynamic braking."

The logical operation of the block system illustrated in FIGURE 8 will become clear from an understanding of the implementing schematic diagram of FIGURE 9, to which attention should be now directed. An alternating current source of electrical energization (not shown) supplies the circuit of FIGURE 9 by means of a pair of input terminals 121 and 122. Connected across the input terminals 121 and 122 is the primary winding of a voltage step-down transformer 123, the secondary winding of which is connected to the light source 109 by means of the conductors 112 and 113 as previously described in connection with the showing of FIGURE 7. A second light source 124 is similarly energized from the transformer 123 and is the light source for the "down" position photocell senser 125. As is observed in the showing of FIGURE 9, the "up" photocell 110 and the "down" photocell 125 are illustrated as variable resistances, which in fact they are. Typically, in the case where the light beam from the associated source 109 or 124 does not fall upon the photocells 110 and 125, the resistance of the photocells may be on the order of 10,000 ohms, whereas when either photocell is subjected to the reflected light beam its resistance drops to approximately 1,000 ohms. It is this change in resistance of the photocells which is effective to trigger the control circuitry and set the auxiliary brake while deenergizing the auxiliary motor, all in a manner to be shortly explained.

Connected to the input terminal 121 is the anode of a diode rectifier 126, the cathode of which is connected to one side of a switch 127 by a conductor 129, and is also connected to one end of a resistor 128 by the conductor 130. The remaining side of the switch 127 is connected simultaneously to several points in the circuit by means of the conductors 131, 132 and 133. The conductor 131 connects the switch 127 to one end of the winding 134 of the control relay 135, the other end of the winding 134 being connected through a capacitor 136 to a normally open contact 137 of the relay 135, and additionally being connected via the conductor 138 to the photocells 110 and 125 by means of the conductors 114 and 139. The conductor 132 connects the switch 127 to a normally closed contact 140 of the relay 135. The conductor 133 connects the switch 127 to one side of a second switch 141 and also to a normally open contact 142 of the needle position selector relay 143. The other side of the switch 141 is connected via conductor 144 to one end of the winding 146 of the relay 143, and via conductor 145 to a pole 147 of the same relay 143, as shown, the pole 147 being engaged with a non-used contact 148. The winding 146 of the relay 143 is connected to the circuit common return line 150 through a resistor 149, the line 150 being the common return to the input terminal 122 for the various components of the circuit. A second pole 151 of the relay 143 is shown engaged with a contact 152 which is connected to the "down" position photocell 125 via a conductor 153, and a second contact 154 also associated with the pole 151 is connected to the "up" photocell 110 via the conductor line 115. The relay pole 151 is returned to the common line 150 through a resistor 155 which is bypassed by a capacitor 156. With the exception of the resistor 128 and the capacitor 136 all of the aforesaid circuit elements are concerned with needle position sensing or needle position selecting, and actuation of the control relay 135 upon the sensing of the needle as it approaches its selected position.

The remainder of the circuitry, including the resistor 128 and the capacitor 136, is associated either with the auxiliary brake 39 or with the auxiliary motor 36a. The remainder of the circuitry includes the poles and contacts of the control relay 135 and the circuit elements associated therewith. The pole 157 of the relay 135 controls the actuation of the auxiliary brake 39, while the poles 158 and 159 control the energization, deenergization and dynamic braking of the auxiliary D.C. motor 36a. The relay pole 157 connects to the cathode of a diode 160 and to one end of the winding 77a of a solenoid 77 via conductor 161, the anode of the diode 160 and the opposite end of the winding 77a being both returned to the common circuit line 150. Associated with the relay pole 157 is a normally open contact 162 which is connected to one end of a capacitor 163 and is also connected to the end of the resistor 128 that is not connected to the conductor line 130. The relay pole 158 connects to one end of the armature winding of the D.C. motor 36a via a conductor 164, and the opposite end of the motor armature winding is returned to the common circuit line 150. Shunted across the armature winding of the motor is a series circuit consisting of a resistor 165 and capacitor 166 which supply contact protection for the relay 135 when the pole 158 transfers from its normally closed contact 140 to its normally open contact 167. The relay pole 159 and the contact 167 are connected to one another and to one end of the motor dynamic braking resistance 168 via the conductor 169, the resistor 168 being also returned to the common line 150.

The switch 127 is the system master control switch because so long as this switch remains in its open position, as illustrated, it is not possible for current to flow from the rectifier 126 to energize either of the position sensing photocells 110 and 125, the needle position selecting relay 143, or the control relay 135. Neither can the auxiliary motor 36a be energized. When, however, the switch 127 is closed it will be observed that a current continuity path may be established between the input terminals 121 and 122 through the rectifier 126, switch 127, relay winding 134, photocell 125, pole 151 and contact 152 of relay 143, and resistor 155. Similarly, current may flow from the switch 127 through conductor 132 to pole 158 and contact 140 of relay 135 and thence to the armature of the auxiliary motor 36a to initiate and maintain rotation of the auxiliary motor shaft. Additionally, when switch 127 is closed, the normally open position switch 141 may be closed to thereby energize the winding 146 of the position control relay 143 to cause it to transfer its contacts and thereby energize the "up" position photocell 110 while simultaneously deenergizing the "down" position photocell 125. Thus, the only portions of the circuitry not affected by the condition of the switch 127 are the circuits which feed the storage capacitor 163 through resistor 128 and which energize the light sources 109 and 124.

Actuation of the switch 127 is controlled by the treadle 35, shown in the organization of FIGURE 3, in such manner that when the treadle 35 is depressed to initiate a normal stitching operation the switch 127 automatically opens, and when the treadle 35 is heeled to terminate a stitching operation the switch 127 is caused to close. Closure of the switch 127 is optimally caused to occur after the rotatable clutch-brake 97 within the main motor drive system 32 disengages from the annular rib 80 of the flywheel 79 that is driven by the main motor but before it engages the fixed brake. This condition is desired so that the auxiliary motor 36a may be started into rotation at the earliest possible instant and without waiting for the brake in the main drive system 32 to become engaged. Thus, the opening and the closing of the switch 127 really occurs upon the clutching and declutching with the motor flywheel of the shiftable clutch and brake 97 in the main drive 32, although in the logical diagrams of FIGURES 1 and 8 the declutching condition is designated as the condition in which the brake is engaged because the declutching is only a transient condition which is rather immediately followed by the steady state brake condition. The needle position selector switch 141 may be physically placed in any convenient location for selector operation, as for example for manual operation or knee actuation by the sewing machine operator. The circuit operates in the following manner.

Assuming that the sewing machine is in operation by virtue of the fact that the treadle 35 has been depressed by the operator, the treadle switch 127 is open as illustrated in FIGURE 9. In this condition the circuit is generally inactive for the reasons already pointed out. However, current flows from the alternating current source into the input terminal 121 where it is rectified by the diode 126 and charges the capacitor 163 through the resistor 128. Charging of the capacitor 163 continues until the voltage thereacross builds up to the peak magnitude of the rectified wave, the capacitor charging current, of course, decreasing in the normal manner as the voltage rises. When now the sewing machine operator heels the treadle 35 to terminate the stitching operation, the switch 127 closes and causes current to flow to the auxiliary motor 36a via the conductor 132, relay 135 contact 140 and pole 158, and conductors 164 and 150. The auxiliary motor 36a is thus caused to rotate and to drive its associated half 40b of the overrun clutch 40. Simultaneously, rectified current also flows through the winding 134 of the relay 135, through the "down" position sensing photocell 125, contact 152 and pole 151 of relay 143, down through resistor 155 and out to terminal 122 over the return line 150. Although current is flowing through the winding 134 of the relay 135, the relay does not at this point transfer its poles because the magnitude of the current flowing through the winding is insufficient to actuate the relay. This insufficient current flow may be due to one of two factors, namely, that the resistance of the photocell 125 is at its high value because it has not recevied a light beam from the source 124 via the reflective strip affixed to the sewing machine hand wheel, or because even though it may receive such a light beam it is unable to respond in sufficient time to actuate the relay 135 by virtue of the fact that the sewing machine speed is still so high that the reflective strip passes beyond the light beam too quickly.

Assuming now that the brake in the main drive system 32 has slowed the spindle shaft speed to the point where the centrifugal clutch 33 has decoupled the spindle shaft from the main drive, and that hence the rotating auxiliary motor 36a has already picked up the spindle shaft 22 through the overrun clutch 40 and has caused the hand wheel to rotate the reflective strip 37a into the path of the light beam from the source 124, the following events take place. Exposure of the photocell 125 to the reflected light beam causes its resistance to suddenly decrease and thus increase the magnitude of the current flowing through the winding 134 of the relay 135. The current increase is sufficient to actuate the relay 135 and cause the poles 157, 158 and 159 to transfer to the left and into engagement respectively with the contacts 162, 167 and 137. The high voltage on capacitor 163 is immediately impressed across the winding 77a of the brake solenoid 77 and immediately sets the brake 39 to stop the spindle shaft 22. The brake solenoid winding 77a is maintained energized by the rectified current flowing from the diode 126 over conductor 130 and through resistor 128. The voltage applied to the brake solenoid winding 77a from the rectifier 126 is of substantially lower magnitude than that which was initially impressed across it from the capacitor 163. The initially impressed high voltage, of course, causes very rapid and positive actuation of the brake solenoid but if maintained at the initial level could cause burn-out of the winding 77a. Such burn-out is prevented because the high voltage across the capacitor 163 cannot be maintained where current is being withdrawn therefrom and hence the voltage thereacross drops to a steady state value determined by the resistor 128 and the impedance of the winding 77a. When, however, at some later time, the relay 135 becomes deenergized and breaks engagement between the pole 157 and contact 162, the capacitor 163 will again begin to charge up to the peak value of the voltage appearing across the input terminals 121 and 122 so that the same rapid brake action may be achieved at the time of next application of the auxiliary brake.

Transfer of the poles 158 and 159 of the relay 135 deenergizes the armature of the auxiliary motor 36a by interrupting the supply of rectified current thereto and institutes immediate dynamic braking of the armature by shunting thereacross the resistor 168 whose resistance may be on the order of a quarter ohm. Upon disengagement of the pole 158 from the contact 140, the electromagnetic field energy of the armature of the D.C. motor 36a gives rise to a voltage across the armature having a polarity which is negative on line 164 and positive at the common return line 150 in an attempt to maintain the flow of current interrupted by transfer of the pole 158, such polarity being in accordance with Lenz's law. Additionally, a voltage of the same polarity also appears across the armature due to the generator effect of the armature rotation. Because of the very low resistance of the resistor 168, a very large current flow through the armature of the D.C. motor results, and such flow, being in an opposite direction to that which flowed while the motor was being energized from the rectified current source, attempts to cause rotation of the armature in the opposie direction and hence exerts a strong braking action on the armature. The braking action is, of course, a function of the current flowing through the armature, and since this current is a function of armature rotation the voltage induced across the armature winding drops off raipdly as the speed of rotation reduces.

Additionally, the negative potential appearing on conductor line 164 is coupled through capacitor 136, the poles 158 and 159, and contacts 167 and 137 of the relay 135 to the low potential end of the relay winding 134 to effectively increase the potential drop thereacross and resist any tendency for the relay to drop out. Since the existence of the negative potential is only a transient condition, the winding 134 is protected against burn-out. In this regard, the presence of the capacitor 136 is required since it will be appreciated that without such capacitor the low potential end of the winding 134 would be directly coupled to the dynamic braking resistance 168, and hence when the transient condition has terminated and steady state conditions are established, the full rectified potential from the source would be impressed across the winding 134 and could cause burn-out thereof. The capacitor 136 prevents such an occurrence by charging up to a positive potential value as determined by the relative impedances of the winding 134, photocell 125 and resistor 155.

The capacitor 156 connected in parallel with the resistor 155 is included in the circuit as an additional means for obtaining very rapid pull in of the relay 135 because it provides an initial bypassing action for the resistor 155, thereby allowing a larger current to flow initially through the winding 134 when the photocell 125 changes resistance in a downward direction. This initial large current through the winding 134 decreases as the capaictor 156 charges up to a final potential which is again determined by the relative resistances of the resistor 155, photocell 125 and relay winding 134. So long as the treadle 35 remains heeled, the switch 127 remains closed and the relay 135 remains energized. Thus, the auxiliary brake 39 remains set and locks the sewing machine spindle shaft.

If it is desired to place the sewing machine needle in the up position rather than in the down position, the position selector switch 141 may be closed by the operator to thereby allow energizing current to flow from line 133 through the switch 141 and down line 144 to the winding 146 of the position relay 143, thence down through resistor 149 to the circuit common return line 150. Energization of the winding 146 causes the poles 147 and 151 of the relay 143 to transfer respectively into engagement with contacts 142 and 154. Establishment of contact between the pole 147 and contact 142 sets up a current flow path therethrough from line 133 which continues over line 145 to the relay winding 146 and thus by-passes the selector switch 141 which may be released by the operator without resulting in drop-out of the relay 143 by virtue of the just described holding circuit. Transfer of the pole 151 to contact 154 interrupts the current continuity path of the winding 134 of relay 135 by opening the circuit through photocell 125. Re-establishment of the current continuity for the relay winding 134 through the "up" photocell 110 does not allow sufficient current flow to maintain the relay 135 in its pulled in condition because the resistance of the photocell 110 is high since the reflective strip 37a is not in proper position to reflect a light beam thereinto from the light source 109. The poles 157, 158 and 159 of relay 135 therefore drop out and transfer to the positions in which they are shown in FIGURE 9, thereby again energizing the auxiliary motor 36a and simultaneously deenergizing the brake solenoid winding 77a to release the brake.

Drop out of the relay pole 157 would tend to cause arcing between this pole and contact 162 due to the inductance of the winding 77a, but this is easily suppressed by the diode 160 which short-circuits the reverse polarity potential suddenly appearing across the winding due to the energy stored in the field. The auxiliary motor 36a rotates the spindle shaft and the hand wheel affixed thereto until the reflective strip 37a comes into position to reflect the light beam from the source 109 into the photocell 110 and thereby energize the winding 134 of the relay 135 and transfer the relay poles to the contacts 137, 167 and 162 resulting in reapplication of the auxiliary brake 39 and deenergization and dynamic braking of the auxiliary motor 36a in the manner previously described.

The foregoing circuit conditions will be maintained until the operator again depresses the treadle 35 to thereby open switch 127 and deenergize relays 135 and 143 resulting in release of the auxiliary brake 39 and reestablishment of the "down" position photocell 125 as the primary position senser. By depressing the treadle 35 the operator may do one of two things as desired. By completely depressing it so as to shift the clutch and brake 97 contained within the main drive 32 into engagement with the motor flywheel 79, a normal stitching operation may be resumed. Alternatively, by depressing the treadle 35 just sufficiently to cause switch 127 to open but not sufficiently to shift the clutch and brake 97 into engagement with the motor flywheel 79, normal stitching will not be resumed but the aforedescribed deenergization of relays 135 and 143 will occur. In this latter case, the operator may then release the treadle to close the switch 127 and thereby cause the raised sewing machine needle to be driven by the auxiliary motor 36a to its down position by virtue of the fact that the "down" position photocell 125 has been re-established as the active sensing device. Thus, it will be understood that a single stitch operation can readily be carried out by the operator by alternately closing the switch 141 to cause the sewing machine needle to rise to its up position, and then depressing the treadle 35 sufficiently to open the switch 127 and thereafter releasing the treadle, which, of course, will then cause the sewing machine needle to be moved to its down position.

Understanding now the operation of the circuitry of FIGURE 9, the remainder of the logic of FIGURE 8 should now be apparent. The gate structure designated as 120 is in reality a part of the relay 135, and as is seen requires an input signal on line 117 together with an input signal on line 170 in order to produce its outputs on lines 118 and 119. Thus, even though the D.C. motor 36a is rotating so that an input to the gate 120 would appear on the line 117, dynamic braking of the motor cannot occur until the relay 135 has been energized by the photocell senser. Upon actuation of the relay 135 a logical signal is generated thereby which appears on line 170 to open the gate 120 and allow the rotation signal to initiate dynamic braking of the motor. Simultaneously, the output of the gate 120 is fed back to the relay 135 to provide a holding action therefor. As should be now apparent, this just described operation is carried out by the poles 158 and 159 of the relay 135, together with the contacts 167 and 137, and the capacitor 136. The booster circuit 171 corresponds, of course, to the circuitry involving the capacitor 163, which it will be recalled from the discussion of FIGURE 9 operates to quickly and strongly energize the brake solenoid when the relay 135 is actuated, the auxiliary brake 39 thereafter being maintained in its applied state by rectified D.C. supplied to its solenoid winding 77a through the pole 157 and contact 162 of the relay 135.

A set of typical components and component values for the elements illustrated in the circuit of FIGURE 9 could be as follows:

| | |
|---|---|
| Relay 135 | C.P. Clare type J, 4,000 ohms. |
| Relay 143 | Potter & Brumfield type KA5D, 1,000 ohms. |
| Resistor 128 | 200 ohms. |
| Resistor 149 | 10,000 ohms. |
| Resistor 155 | 10,000 ohms. |
| Resistor 165 | 1 ohm. |
| Resistor 168 | ¼ ohm. |
| Capacitor 136 | 50 microfarads. |
| Capacitor 156 | 2 microfarads. |
| Capacitor 163 | 150 microfarads. |
| Capacitor 166 | 10 microfarads. |
| Photocells 110, 125 | Clarex type 504. |
| Rectifier 126 | Type 1N2240, silicon diode. |
| Rectifier 160 | 110 v. A.C., 50 milliamperes, selenium. |
| Solenoid 77 | Anderson Control Co., type D17. |
| Motor 36a | Rae Mfg. Co. type M500, 5,000 r.p.m. reduced to approximately 350 r.p.m. |

*Alternate System*

The alternate system to be now described again illustrates the logic of the generalized diagram of FIGURE 1 but illustrates another mode of implementing the logic. The major difference between the system to be now described and the system which has previously been described in detail resides in a different form of senser device and a different form of indexer, these differences resulting in a modified coupling between the main motor drive system 32 and the sewing machine spindle shaft 22. In this alternative system, the sewing machine spindle shaft 22 is directly coupled to the shaft 27 associated with the revoluble brake drum 62 and the half 40a of the overrun clutch 40, such coupling being illustrated in the showing of FIGURE 10 which is a modified fragmented view of the upper left-hand portion of FIGURE 4. The direct coupling of the spindle shaft 22 to the shaft 27, of course, requires that the housing 28, illustrated beneath the table top 19 in the showing of FIGURE 3, be physically mounted immediately to the right of the sewing machine hand wheel 21a and pulley 21. This changed physical configuration eliminates the need for the pulleys 26 and 29 and the belt 30, resulting in a direct belt connection between the hand wheel pulley 21 and the main drive centrifugal clutch pulley 31, as for example by means of the belt 25.

Figure 10:
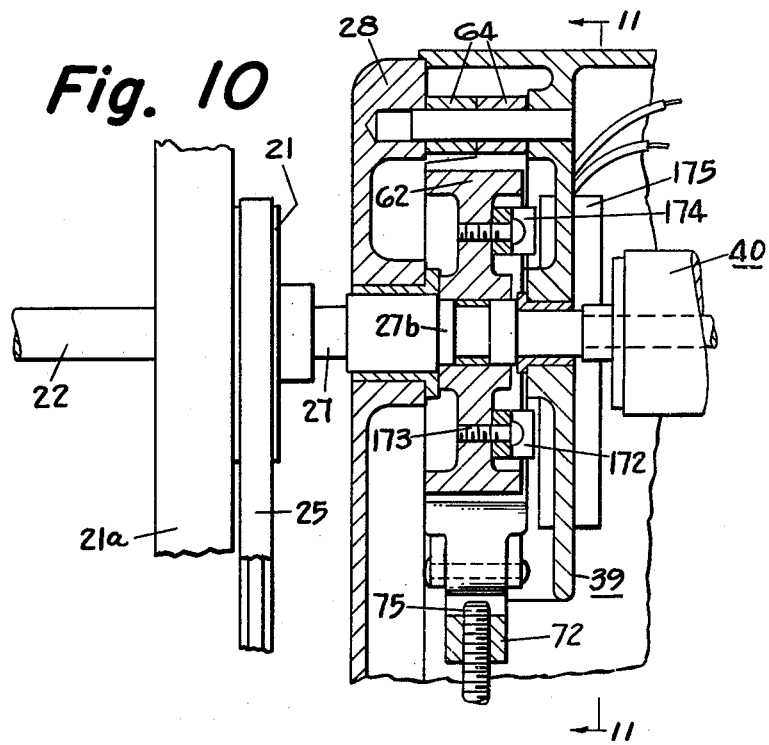
FIGURE 10 is a sectional fragmentary view showing an alternate indexer-senser system associated with the auxiliary brake device seen in FIGURES 4 and 5.
Figure 11:
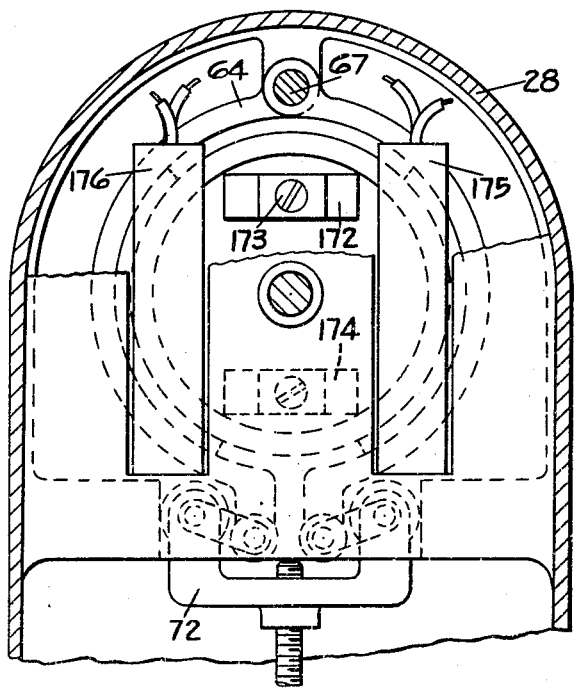
FIGURE 11 is a cross-sectional view as would be seen when viewed along the lines 11—11 of FIGURE 10, and shows additional details of the alternate indexer-senser.

In this alternative construction the indexer 37 of FIGURE 1 takes the form of a magnet 172 secured as by a bolt 173 to the revoluble brake drum 62. Dynamic balance of the revoluble brake drum 62 is maintained by securing thereto a dummy mass 174 as indicated in FIGURES 10 and 11. Additionally, the sensers 38 of FIGURE 1 take the form of a pair of magnetically actuatable switches 175 and 176 physically mounted within the housing 28 in close proximity to the rotating magnet 172, the contacts of a selected one of the switches being transferrable by magnetic action to effect needle positioning in a manner which will subsequently be described in connection with the circuitry of FIGURE 12. Excepting for the different form taken by the indexer and sensers, and the elimination of the pulleys 26 and 29 together with the belt 31, the mechanical and operational aspects of this alternative form of the invention are exactly the same as those aspects already described in connection with the system illustrated organizationally in FIGURE 3. Attention should be now directed to the schematic diagram of FIGURE 12 for an understanding of the operational aspects of this alternative form of the invention.

In FIGURE 12 are shown a pair of input terminals 177 and 178 for energizing the circuit from a source of alternating current. In series with one side of the energizing source is a switch 179 operated by the sewing machine treadle 35 in exactly the same manner as has already been described for the switch 127 shown in the circuit of FIGURE 9. The contact of the switch 179 is connected to the pole of the needle position selector switch 180 via line 204 and is also connected to the pole 186 of control relay 183 via conductor line 205. The control relay 183 is shown in its deenergized state which results in control of the auxiliary A.C. motor 36' by means of the down position sensing switch 175. Continuity to the motor is established when the treadle switch 179 is closed via the switch 180 and contact 181 thereof, upward through the pole 185 and contact 188 of the relay 183 to the pole 198 and contacts 201 of the down position switch 175, thence over conductor line 207 to the motor 36' and back to the input terminal 177 via the conductor 210. Thus, when the treadle 35 has been released and the switch 179 thereafter closes, the auxiliary motor 36' is energized and drives the spindle shaft of the sewing machine in the now well-known manner until the magnet 172 approaches the down position sensing switch 175. Thereupon, the magnet 172 causes the pole 198 of the senser 175 to transfer from the swtich contact 201 over to the switch contact 200. Current continuity to the auxiliary motor 36' is therefore interrupted and the motor is deenergized, while simultaneously current continuity is established through the winding 191 of the auxiliary brake solenoid through the transferred pole 198 of the senser 175, over the conductor line 208 and back to the input terminal 177 over the conductor lines 209 and 210. Application of the auxiliary brake brings the spindle shaft of the sewing machine to a halt in its desired indexed position.

In the event that it is desired to bring the sewing machine needle to a stop in its up position, the position switch 180 is tripped by the operator to transfer the pole thereof over to contact 182, thus breaking circuit continuity through the down position sensing switch 175 and establishing continuity to the motor 36' through the up position sensing switch 176 in the following manner. Transfer of the pole of the switch 180 into engagement with the contact 182 establishes an energizing current path from the input terminal 178 through the switch 179 and switch 180 to conductor line 206 and to one end of the winding 184 of the relay 183, the circuit being completed through the winding 184 and conductor lines 209 and 210 back to the input terminal 177. Energization of the relay 183 causes the poles 185, 186 and 187 thereof to transfer. A holding circuit for the relay 183 is established through the pole 186 and contact 189 of that relay so that when the pole of the position switch 180 is allowed to return into engagement with its contact 181, the relay 183 will not drop out. Disengagement of the pole 185 from its contact 188 remains the open circuit condition through the down senser switch 175, thereby disabling it. Engagement of the relay pole 187 with its contact 190 completes the current continuity path from the conductor 206 through the pole 199 and the contacts 203 of the up senser 176 to conductor line 207 and hence to the auxiliary motor 36' and back to the input terminal 177 via conductor line 210. The auxiliary motor 36' rotates the spindle shaft 22 until the magnet 172 causes transfer of the pole 199 of up sensing switch 176 from its contacts 203 to its contact 202, at which time the energization for the auxiliary motor 36' is interrupted. Transfer of the pole 199 to the contacts 202 energize the winding 191 of the brake solenoid in exactly the same manner as has been previously described and thereby sets the auxiliary brake to stop the rotation of the spindle shaft 22 at the desired point. Depression of the treadle 35 sufficiently to open the switch 179 brakes the holding current circuit for the relay 183 and hence causes it to drop out and re-establish its illustrated condition, thereby reconnecting the down position sensing switch 175 into the circuit.

Obviously, single stitch operation may be carried out by the operator by manipulation of the treadle switch 179 and the selector switch 180 in exactly the manner as has already been set forth in connection with the circuitry of FIGURE 9 previously described.

The series resistance capacitance networks including resistors 192, 193 and 194 together with capacitors 195, 196 and 197 operate as arc suppressors for the protection of the relay and switch contacts, and have no other circuit significance.

Having now described my invention both as to the principles thereof and in connection with particularly illustrated embodiments thereof, it will be apparent that various changes and modifications may occur from time to time to persons normally skilled in the art for differing applications without departing from the general principles or real spirit of the invention, and accordingly, it is intended to claim the same broadly as well as specifically, as indicated by the appended claims.

What is claimed as new and useful is:

1. For use with a sewing machine having a primary drive means for continuously driving the needle of the sewing machine to effect stitching and having a primary brake means for braking the sewing machine needle to terminate stitching and including means for selectively rendering operable the primary drive or the primary brake, a mechanism for automatically causing the sewing machine needle to stop in a desired position comprising in combination, needle position indexing and sensing means adapted for coupling to the sewing machine needle drive and effective when so coupled for indicating the instantaneous position of the needle and sensing at least one predetermined position thereof, auxiliary drive means adapted for coupling to the sewing machine needle drive and effective when so coupled for driving the sewing machine needle to the aforesaid sensable predetermined position, auxiliary brake means adapted for coupling to the sewing machine needle drive and effective when so coupled and actuated for stopping the needle at the desired position, control means operable by said indexing and sensing means for actuating said auxiliary brake and deactivating said auxiliary drive when said predetermined needle position is sensed, first coupling means for coupling said auxiliary drive means to the said needle drive, and second coupling means adapted for disposition between said sewing machine needle drive on the one hand and said primary drive and brake means on the other hand and effective when so disposed for coupling said needle drive to said primary drive means only after the driving speed of the latter has achieved a minimum predetermined value and being also effective for decoupling said needle drive from said primary brake means as soon as the latter has reduced the speed of the needle drive to the aforesaid minimum predetermined value, whereby, when said needle drive has been coupled to said auxiliary drive and decoupled from said primary brake by said first and second coupling means respectively and when said control means have been operated by said indexing and sensing means, said auxiliary drive is deactivated and said auxiliary brake is actuated to stop the needle at the desired position.

2. The combination according to claim 1 wherein said second coupling means comprises a centrifugal clutch having a first part which is driven and braked by the primary drive and brake means respectively, having a second part which moves with the sewing machine needle drive mechanism, and having a third part responsive to the speed of the first part effective for intercoupling the first and second parts above a pre-set speed and effective for decoupling the first and second parts below a pre-set speed.

3. The combination according to claim 1 wherein said first coupling means comprises an overrun clutch having a first part which is rotatably driven by the said auxiliary drive and having a second rotatable part which moves with the sewing machine needle drive mechanism, the first and second clutch parts being so organized that clutching therebetween takes place only when the first part driven by the auxiliary drive tends to rotate faster than the second part which rotates with the needle drive mechanism.

4. The combination according to claim 1 wherein said auxiliary drive means comprises a direct current motor and wherein said control means includes first means for deactivating said motor by interrupting the current supply to the motor armature and for immediately thereafter dynamically braking the motor by connecting the armature across a very low value of resistance.

5. The combination according to claim 1 further including second control means for automatically disabling said indexing and sensing means whenever said primary drive is rendered operable by the said sewing machine means for selectively rendering operable the primary drive or the primary brake.

6. The combination according to claim 1 wherein said auxiliary brake comprises, a revoluble brake drum mounted for rotation on a shaft coupled to said needle drive, at least one brake shoe normally biased out of engagement with said drum so that the latter is thereby enabled to rotate freely, and solenoid means energizable by said control means for overriding the normal brake shoe disengagement bias to quickly and forcefully drive the said at least one brake shoe against the drum and thereby brake the needle drive, said control means including means for initially applying an over voltage to the brake solenoid for achieving substantially instantaneous actuation and for thereafter applying a reduced voltage to the solenoid for the duration of the braking interval.

7. The combination according to claim 1 wherein said auxiliary brake comprises, a revoluble brake drum mounted for rotation on a shaft coupled to said needle drive, at least one brake shoe normally biased out of engagement with said drum so that the latter is thereby enabled to rotate freely, and means actuatable by said control means for overriding the normal brake shoe disengagement bias to quickly and forcefully drive the said at least one brake shoe against the drum and thereby brake the needle drive, said wherein said first coupling means comprises an overrun clutch having a first part which is rotatably driven by the said auxiliary drive and having a second part mounted for rotation upon the same shaft as the revoluble brake drum and which therefore moves with the sewing machine needle drive mechanism, the first and second clutch parts being so organized that clutching therebetween take place only when the first part driven by the auxiliary drive rotates at a faster rate than the second part which rotates with the needle drive mechanism.

8. The combination according to claim 1 wherein said auxiliary brake comprises, a revoluble brake drum mounted for rotation on a shaft coupling to said needle drive, at least one brake shoe normally biased out of engagement with said drum so that the latter is thereby enabled to rotate freely, and means actuatable by said control means for overriding the normal brake shoe disengagement bias to quickly and forcefully drive the said at least one brake shoe against the drum and thereby brake the needle drive.

9. The combination according to claim 8 wherein the revoluble brake drum shaft is coupled directly to the sewing machine spindle shaft for rotation therewith, and wherein the said needle position indexing and sensing means comprises an indexing portion and a sensing portion, one of which portions is secured for rotation with the said brake drum shaft and the other of said portions being positioned at a fixed location proximate thereto.

10. The combination according to claim 8 wherein the revoluble brake drum shaft is indirectly coupled to the sewing machine spindle shaft for rotation therewith, and wherein said needle position indexing and sensing means comprises an indexing portion and a sensing portion, one of which portions is directly secured for rotation with the sewing machine spindle shaft and the other of said portions being positioned at a fixed location proximate thereto.

11. In combination, first and second relatively movable members so related that particular positions of said first member always correspond to particular positions of said second member, means associated with one of said members for sensing at least one predetermined position thereof, drive means responsive to actuation of control means for driving one of said members, said drive means including means automatically effective for coupling said one member to said drive means whenever the driving speed thereof exceeds a predetermined value and automatically effective for decoupling said one member from said drive means whenever the driving speed of the latter falls below said predetermined value, said drive means further including primary braking means responsive to deactuation of said control means for slowing the driving speed of asid drive means to the said predetermined value, and auxiliary braking means thereafter activated under the control of said sensing means for braking said one member to stop at the said predetermined position.

12. In combination, first and second relatively movable members so related that particular positions of said first member always correspond to particular positions of said second member, means associated with one of said members for sensing at least one predetermined position thereof, first and second drive means for driving one of said members, said first drive means being operable to produce continuous motion of said one member only above a predetermined speed in response to the actuation of first control means, said second drive means being operable to produce limited motion of said one member at substantially said predetermined speed for driving said one member to the said sensable predetermined position, and second control means for decoupling said one member from said first drive means and coupling said one member to said second drive means substantially at said predetermined speed after deactuation of said first control means, said second drive means being thereafter deactivated and said one member being braked to a stop at the said predetermined position under the control of said sensing means.

13. In combination, first and second relatively movable members so related that particular positions of said first member always correspond to particular positions of said second member, means associated with one of said members for sensing at least one predetermined position thereof, first and second drive means each rendered operable for driving one of said members in response respectively to actuation and deactuation of first control means, means automatically effective for coupling said one member to said first drive means whenever the driving speed thereof exceeds a predetermined value and automatically effective for decoupling said one member from said first drive means and coupling said one member to said second drive means whenever the driving speed of said first drive means falls below said predetermined value, said first drive means including therewithin braking means responsive to deactuation of said first control means for slowing the driving speed of said first drive means to the said predetermined value, and second control means responsive to said sensing means for deactivating and rendering inoperable said second drive means and for stopping said one member at the said predetermined position.

14. In combination, first and second relatively movable members so related that particular positions of said first member always correspond to particular positions of said second member, means associated with one of said members for sensing at least one predetermined position thereof, first and second drive means each rendered operable for driving one of said members in response respectively to actuation and deactuation of first control means, means automatically effective for coupling said one member to said first drive means whenever the driving speed thereof exceeds a predetermined value and automatically effective for decoupling said one member from said first drive means and coupling said one member to said second drive means whenever the driving speed of said first drive means falls below said predetermined value, said first drive means including therewithin braking means responsive to deactuation of said first control means for slowing the driving speed of said first drive means to the said predetermined value, auxiliary braking means, and second control means responsive to said sensing means for deactivating and rendering inoperable said second drive means and for stopping said one member at the said predetermined position by actuating said auxiliary braking means.

15. In combination, first and second relatively movable members so related that particular positions of said first member always correspond to particular positions of said second member, means associated with one of said members for sensing at least one predetermined position thereof, first drive means for producing continuous motion of said first member when coupled thereto, first control means for automatically coupling said first member to said first drive means when the driving speed of the latter exceeds a predetermined value and for automatically decoupling said first member from said first drive means when the driving speed of the latter falls below the said predetermined value, second control means selectively operable for causing the driving speed of said first drive means to rise above or fall below said predetermined value, second drive means for driving said first member at substantially the aforesaid predetermined value, means for coupling said second drive means to said first member when the former is activated and when the speed of the latter falls below the said predetermined value, activation means for activating said second drive means whenever the driving speed of said first drive means starts to decrease, and means controlled by said sensing means for thereafter deactivating said second drive means and stopping said first member at the said sensable predetermined position.

16. In combination, first and second relatively movable members so related that particular positions of said first member always correspond to particular positions of said second member, position indexing and sensing means associated and at least partially moving with one of said members for sensing at least one predetermined position thereof by the establishment of a non-physical signal coupling between the indexing and sensing means, drive means responsive to actuation of control means for driving one of said members, said drive means including means automatically effective for coupling said one member to said drive means whenever the driving speed thereof exceeds a predetermined value and automatically effective for decoupling said one member from said drive means whenever the driving speed of the latter falls below said predetermined value, said drive means further including primary braking means responsive to deactuation of said control means for slowing the driving speed of said drive means to the said predetermined value, and auxiliary braking means thereafter activated under the control of said sensing means for braking said one member to stop at the said predetermined position.

17. The combination according to claim 16 wherein the indexing portion of said indexing and sensing means radiates energy above a threshold magnitude into a bounded region, and wherein the sensing portion of said indexing and sensing means is located at a desired position within said bounded region and is responsive to energy levels above the said threshold magnitude.

18. The combination according to claim 16 wherein said indexing and sensing means comprise a photon responsive sensing device, a photon source, and means for directing photons from said source to the photon responsive sensing device.

19. The combination according to claim 16 wherein said indexing and sensing means includes magnetic field establishing means which moves with the said one member, and wherein said indexing and sensing means includes means responsive to magnetic field intensities above a predetermined magnitude, the moving magnetic field being of sufficient strength to be detected by said magnetic field responsive means when said one member assumes the aforesaid predetermined position.

References Cited in the file of this patent

UNITED STATES PATENTS

| | | |
|---|---|---|
| 2,129,847 | Knodel | Sept. 13, 1938 |
| 2,517,567 | Hill et al. | Aug. 8, 1950 |
| 2,836,276 | Schwab et al. | May 27, 1958 |
| 2,908,778 | Strandberg | Oct. 13, 1959 |
| 2,961,591 | Frankel et al. | Nov. 22, 1960 |

FOREIGN PATENTS

| | | |
|---|---|---|
| 779,876 | Great Britain | July 24, 1957 |